US012079351B2

(12) United States Patent
Begg et al.

(10) Patent No.: US 12,079,351 B2
(45) Date of Patent: *Sep. 3, 2024

(54) APPLICATION OF TRAINED ARTIFICIAL INTELLIGENCE PROCESSES TO ENCRYPTED DATA WITHIN A DISTRIBUTED COMPUTING ENVIRONMENT

(71) Applicant: The Toronto-Dominion Bank, Toronto (CA)

(72) Inventors: James Anthony Begg, Toronto (CA); Omar Hamdan, Toronto (CA); Sertac Kabadayi, Toronto (CA); Zezhong Zheng, Toronto (CA); Jinoj Titus, Oshawa (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,374

(22) Filed: Sep. 12, 2023

(65) Prior Publication Data
US 2023/0418956 A1 Dec. 28, 2023

Related U.S. Application Data

(63) Continuation of application No. 17/062,805, filed on Oct. 5, 2020, now Pat. No. 11,809,577.
(Continued)

(51) Int. Cl.
*G06F 21/60* (2013.01)
*G06N 3/04* (2023.01)
(Continued)

(52) U.S. Cl.
CPC .............. *G06F 21/602* (2013.01); *G06N 3/04* (2013.01); *G06N 3/08* (2013.01); *H04L 9/008* (2013.01)

(58) Field of Classification Search
CPC .......... G06F 21/602; G06N 3/04; H04L 9/008
See application file for complete search history.

(56) References Cited

U.S. PATENT DOCUMENTS 10,172,111 B2  1/2019  Byun et al.
10,178,111 B1  1/2019  Wilson et al.
(Continued)

*Primary Examiner* — Viral S Lakhia
(74) *Attorney, Agent, or Firm* — Duane Morris LLP

(57) ABSTRACT

The disclosed embodiments include computer-implemented processes that predict a credit score for a customer in real-time based on an application of a trained machine-learning or artificial-intelligence process to encrypted event data at a third-party computing cluster. For example, an apparatus may transmit encrypted event data to a third-party computing system. The third-party computing system may apply a trained artificial intelligence process to encrypted feature data that includes the encrypted event data, and the apparatus may receive, from the third-party computing system, encrypted output data representative of a predicted credit score during at least one temporal interval. The apparatus may decrypt the encrypted output data using a homomorphic decryption key, and transmit a notification that includes the decrypted output data to a device. An application program executed at the device may present a graphical representation of at least a portion of the decrypted output data within a digital interface.

20 Claims, 13 Drawing Sheets

Related U.S. Application Data

(60) Provisional application No. 63/075,260, filed on Sep. 7, 2020.

(51) Int. Cl.
  *G06N 3/08* (2023.01)
  *H04L 9/00* (2022.01)

(56) References Cited

U.S. PATENT DOCUMENTS

| | | | |
|---|---|---|---|
| 10,181,049 | B1 | 1/2019 | El Defrawy et al. |
| 10,339,527 | B1 | 7/2019 | Coleman et al. |
| 10,404,668 | B2 * | 9/2019 | Tissot ................ H04L 63/0428 |
| 10,546,141 | B2 * | 1/2020 | Miguel ................ H04L 9/0861 |
| 10,885,216 | B2 | 1/2021 | Hahn et al. |
| 11,095,428 | B2 * | 8/2021 | Vaikuntanathan ...... H04L 63/08 |
| 11,238,077 | B2 | 2/2022 | Ramakrishna et al. |
| 11,251,936 | B2 | 2/2022 | Lakshmanan et al. |
| 11,275,848 | B2 | 3/2022 | Cheung |
| 11,394,552 | B2 | 7/2022 | Streit |
| 11,469,878 | B2 * | 10/2022 | Shpurov ................ H04L 9/30 |
| 11,496,287 | B2 * | 11/2022 | Sehrawat ............ H04L 9/0833 |
| 11,615,208 | B2 | 3/2023 | Truong et al. |
| 11,698,990 | B2 * | 7/2023 | McFall ............ G06F 21/6245 |
| | | | 726/26 |
| 2018/0075527 | A1 | 3/2018 | Nagla et al. |
| 2018/0212759 | A1 * | 7/2018 | Williams ............ G06F 21/6218 |
| 2019/0205791 | A1 | 7/2019 | Litherland et al. |
| 2019/0370334 | A1 | 12/2019 | Bhowmick et al. |
| 2020/0134199 | A1 | 4/2020 | Conway |
| 2020/0175426 | A1 | 7/2020 | Li et al. |
| 2020/0228336 | A1 | 7/2020 | Streit |
| 2020/0302234 | A1 | 9/2020 | Walters et al. |
| 2020/0387832 | A1 | 12/2020 | Jordan et al. |
| 2021/0328764 | A1 | 10/2021 | Kim et al. |
| 2022/0164874 | A1 | 5/2022 | Sindlar et al. |
| 2022/0302234 | A1 | 9/2022 | Xue et al. |

\* cited by examiner

… (1)

APPLICATION OF TRAINED ARTIFICIAL INTELLIGENCE PROCESSES TO ENCRYPTED DATA WITHIN A DISTRIBUTED COMPUTING ENVIRONMENT

CROSS-REFERENCE TO RELATED APPLICATION

This application is a continuation of, and claims the benefit of priority to, U.S. application Ser. No. 17/062,805, filed Oct. 5, 2020, which claims the benefit of priority under 35 U.S.C. § 119(e) to prior U.S. Application No. 63/075,260, filed Sep. 7, 2020. The disclosures of each of these applications are incorporated by reference herein to their entireties.

TECHNICAL FIELD

The disclosed embodiments generally relate to computer-implemented systems and processes that apply a trained artificial intelligence process to encrypted data within a distributed computing environment.

BACKGROUND

Machine learning and artificial intelligence models are widely adopted throughout the financial services industry, and in many instances, the output of these machine learning and artificial intelligence models may inform not only decisions related to a credit or insolvency risk of various customers, but also decisions related to the marketing of financial products or services to these customers. Although many distributed computing environments, such as publicly accessible computing clusters, provide parallelized, fault-tolerant distributed computing facilities amenable to the training and deployment of machine learning and artificial intelligence models, confidentiality and data-privacy restrictions imposed on the financial services industry often prevent a financial institution from transmitting unencrypted elements of confidential data to these public, cloud-based computing clusters for storage, or for training and subsequent input into, these machine learning or artificial intelligence models.

SUMMARY

In some examples, an apparatus includes a memory storing instructions, a communications interface, and at least one processor coupled to the memory and the communications interface. The at least one processor is configured to execute the instructions to transmit, via the communications interface, encrypted event data to a third-party computing system. The third-party computing system is configured to apply a trained artificial intelligence process to encrypted feature data that includes the encrypted event data. The at least one processor is further configured to execute the instructions to receive encrypted output data from the third-party computing system via the communications interface. The encrypted output data is representative of a predicted credit score during at least one temporal interval. Further, the at least one processor is configured to execute the instructions to decrypt the encrypted output data using a homomorphic decryption key, and transmit a notification that includes the decrypted output data to a device via the communications interface, the device executing an application program that presents a graphical representation of at least a portion of the decrypted output data within a digital interface.

In other examples, a computer-implemented method includes transmitting, using at least one processor, encrypted event data to a third-party computing system. The third-party computing system is configured to apply a trained artificial intelligence process to encrypted feature data that includes the encrypted event data. The computer-implemented method also includes receiving, using the at least one processor, encrypted output data from the third-party computing system. The encrypted output data is representative of a predicted credit score during at least one temporal interval. The computer-implemented method includes, using the at least one processor, decrypting the encrypted output data using a homomorphic decryption key, and transmitting a notification that includes the decrypted output data to a device. The device executes an application program that presents a graphical representation of at least a portion of the decrypted output data within a digital interface.

Additionally, in some examples, an apparatus includes a memory storing instructions, a communications interface, and at least one processor coupled to the memory and the communications interface. The at least one processor is configured to execute the instructions to receive encrypted event data via the communications interface, generate encrypted feature data that includes the encrypted event data and one or more elements of encrypted customer data, and apply a trained artificial intelligence process to the encrypted feature data. Based on the application of the trained artificial intelligence process to the encrypted feature data, the at least one processor is also configured to execute the instructions to generate encrypted output data representative of a predicted credit score during at least one temporal interval. The at least one processor is further configured to execute the instructions to transmit the encrypted output data to a computing system via the communications interface. The computing system is configured to decrypt the encrypted output data using a homomorphic decryption key and to transmit the decrypted output data to a device associated with the customer.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
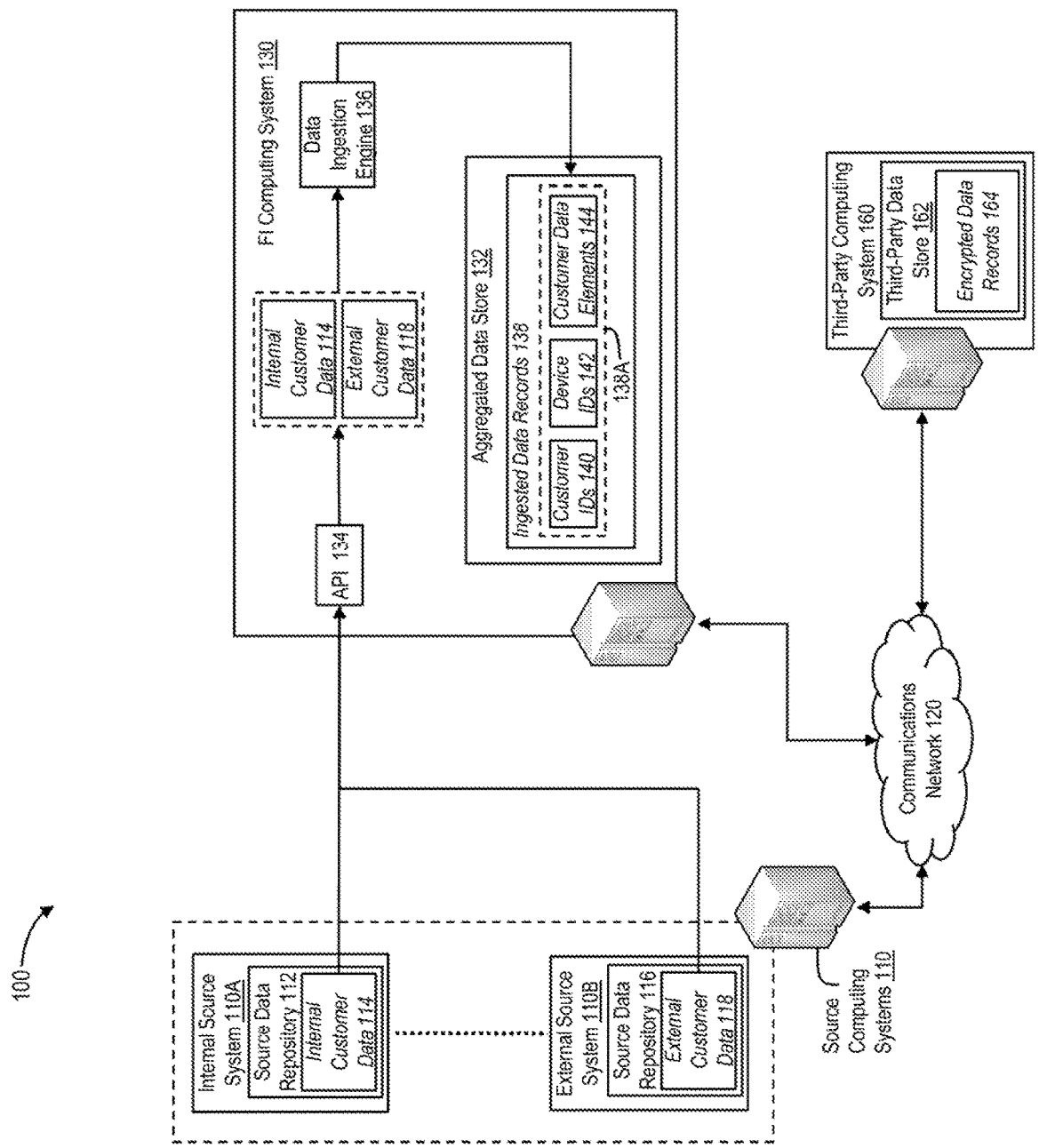
FIGS. 1A-1C, 2A-2D, 3A, and 3B are block diagrams illustrating portions of an exemplary computing environment, in accordance with some exemplary embodiments.

Modern financial institutions offer a variety of financial products or services to their customers, both through in-person branch banking and through various digital channels, and decisions related to the provisioning of a particular financial product or service to a corresponding customer are often informed by the customer's relationship with the financial institution and the customer's use, or misuse, of other financial products or services. For example, one or more computing systems of a financial institution (e.g., the "FI computing systems") may obtain, generate, and maintain elements of data that characterize the customer's relationship with the financial institution and the customer's use, or misuse, of other financial products or services may collectively establish a time-evolving risk profile for the customer. The risk profile for the particular customer may include, or be based upon, elements of customer profile data, which identifies the customer and characterizes the customer's relationship with the financial institution, account data, which identifies and characterizes one or more financial products issued to the customer by the financial institution, transaction data identifying and characterizing one or more transactions involving these issued financial products, or external reporting data, such as credit bureau data associated with the particular customer.

In some instances, and to further characterize the risk posed to the financial institution by the particular customer, the FI computing systems may analyze the elements of customer profile, account, transaction, or reporting data and generate a corresponding score that characterizes the level of risk associated with the particular customer. The generated score may, for example, represent a credit score associated with the particular customer, and the credit score may be indicative of a likelihood that the particular customer will satisfy, or alternatively, default, on obligations associated with financial products or services provisioned to the particular customer by the financial institution (e.g., a credit risk posed by the particular customer to the financial institution). Based on the generated credit score, the FI computing systems may perform operations that render decisions related not only to an initial provisioning of a financial product or service to the particular customer, including a determination of an appropriate set of initial terms or conditions, but also to modify the terms or conditions of a financial product or service previously provisioned to the particular customer, e.g., in response to an evolving utilization of the previously provisioned financial product or service.

Although the credit score may represent a useful metric for characterizing the credit risk posed to the financial institution by the particular customer, many credit scoring processes implemented by the FI computing systems, and the elements of raw or processed data input to these credit scoring processes, are often specific to, and held confidential by, the financial institution. Due to the confidentiality associated with these credit-scoring processes, the customers of the financial institution may lack an understanding of those actions that contribute to their current credit score, and may be incapable of identifying an impact of a future, contemplated action (e.g., a large purchase using an issued credit line, a delayed payment on that credit line, etc.) on the current credit score. In many instances, the lack of customer understanding of, and interaction with, the credit-scoring process may limit an ability of the financial institution to identify, to a customer through in-person branch banking or appropriate digital channels, additional, or alternative, financial products or services that, if provisioned to the customer, may improve the credit risk score of the customer and reduce the customer's credit risk.

Further, many publicly accessible, distributed or cloud-based computing clusters (e.g., those maintained by Microsoft Azure™, Amazon Web Services™, Google Cloud™, and other third-party providers, etc.) provide parallelized, fault-tolerant distributed computing and analytical protocols (e.g., the Apache Spark™ distributed, cluster-computing framework, the Databricks™ analytical platform, etc.) that facilitate not only an adaptive training of machine learning or artificial intelligence processes, but also an application, in real-time, of the adaptively trained machine learning processes or artificial intelligence processes to elements of corresponding input data. These machine-learning and artificial-intelligence processes (and additionally, or alternatively, other deep-learning processes or operations) often involve large numbers of massively parallelizable vector-matrix operations, and the distributed or cloud-based computing clusters, such those described herein, often include graphics processing units (GPUs) capable of processing thousands of operations (e.g., vector operations) in a single clock cycle, and additionally, or alternatively, tensor processing units (TPUs) capable of processing hundreds of thousands of operations (e.g., matrix operations) in a single clock cycle. The implementation of the parallelized, fault-tolerant distributed computing and analytical protocols described herein across clusters of GPUs and/or TPUs may, in some instances, accelerate the training and subsequent deployment of the machine-learning and artificial-intelligence processes, and may result in a higher throughput during training and subsequent deployment, when compared to the training and subsequent deployment of the machine-learning and artificial-intelligence processes across comparable clusters of central processing units (CPUs) capable of processing a single, scalar operation in a single clock cycle.

The machine-learning or artificial-intelligence processes implemented by certain of these publicly accessible, distributed or cloud-based computing clusters, such as a "third-party" computing cluster associated with a third party unrelated to the financial institution, may be incapable of operating on, or ingesting, elements of encrypted data during either an initial training phase, or during a subsequent deployment phase. Instead, these publicly accessible, distributed or cloud-based computing clusters may maintain locally one or more decryption keys (e.g., a public cryptographic key associated with the FI computing systems, etc.), which facilitate a decryption of any encrypted elements of training or input data (e.g., encrypted elements of the confidential customer profile, account, or transaction data received from the FI computing systems, etc.) prior to ingestion by the machine-learning or artificial-intelligence processes.

In some instances, however, confidentiality and privacy restrictions imposed on the financial institution by regulatory, governmental, or judicial entities may prevent the FI computing systems from transmitting unencrypted elements of confidential customer profile, account, or transaction data across a communications network to the publicly accessible distributed or cloud-based computing clusters, e.g., for storage at these computing clusters, or for training of and subsequent input into, the machine learning or artificial intelligence processes. Moreover, even if the FI computing systems were to transmit encrypted confidential customer profile, account, or transaction data across the communications network to the publicly accessible distributed or cloud-based computing clusters, the confidentiality and privacy restrictions imposed on the financial institution may inhibit an ability of the publicly accessible distributed or cloud-based computing clusters to decrypt the encrypted elements of confidential customer profile, account, or transaction data, much less to store locally or perform operations involving these decrypted elements of confidential customer profile, account, or transaction data.

In some exemplary embodiments, described herein, a machine-learning or artificial-intelligence process implemented across one or more processors of a publicly available, third-party computing cluster may be trained adaptively to predict a credit score of a customer of a financial institution using encrypted training data. The encrypted training data may, for example, include elements of confidential customer profile, account, transaction, or reporting data encrypted homomorphically by one or more of the FI computing systems (e.g., which may collectively establish a distributed computing cluster associated with the financial institution) using a corresponding homomorphic encryption scheme, and the homomorphically encrypted elements of confidential customer profile, account, transaction, or reporting data may be ingested into a corresponding distributed data repository or data lake maintained at the third-party computing cluster while maintaining a privacy and a confidentiality of the underlying customer profile, account, transaction, or reporting data.

As described herein, the homomorphic encryption scheme may include, but is not limited to, a fully homomorphic encryption scheme, which facilies arbitrary computations on ciphertext and generates encrypted results that, when decrypted, match the results of the arbitrary computations performed on corresponding elements of plaintext. Further, and by way of example, the machine-learning and artificial-intelligence processes may include an artificial, feed-forward neural network model, such as a convolutional neural network model characterized by an input layer, and output layer, and one or more hidden layers (e.g., convolutional layers that include one or more activation layers, pooling layers, or normalization layers). In some instances, based on computational restrictions imposed by the homomorphic encryption scheme, each of operations within the convolutional neural network model may be represented, or decomposed into, corresponding addition or multiplication operations (e.g., addition or multiplication operations on integers or floating-point numbers).

Through the implementation of the exemplary processes described herein, the computing systems of the third-party computing cluster may perform operations that adaptively train a machine learning or artificial intelligence process based on secure, homomorphic computations on training datasets selected from the homomorphically encrypted elements of customer profile, account, transaction, or reporting data. Further, the trained machine learning or artificial intelligence process (e.g., the trained convolutional neural network described herein) may further ingest one or more homomorphically encrypted input datasets associated with a customer of the financial institution, and based on an application of the trained convolutional neural network model to the homomorphically encrypted input datasets, the computing systems of the public, third-party computing cluster may generate homomorphically encrypted output data representative of a predicted credit score of that customer during a current temporal interval and additionally, or alternatively, during one or more discrete, future temporal intervals. The FI computing systems may receive the homomorphically encrypted output data from the publicly accessible, third-party computing cluster, and upon decryption using a corresponding homomorphic decryption key, the FI computing systems may recover the predicted credit score (or scores) of the customer, and perform operations that provision a notification associated with the predicted credit score (or scores) to a device operable by the customer, e.g., for presentation as a pop-up notification or window within an digital interface of an executed mobile banking application, or as a banner notification within a home page of an executed operating system.

Figure 1B:
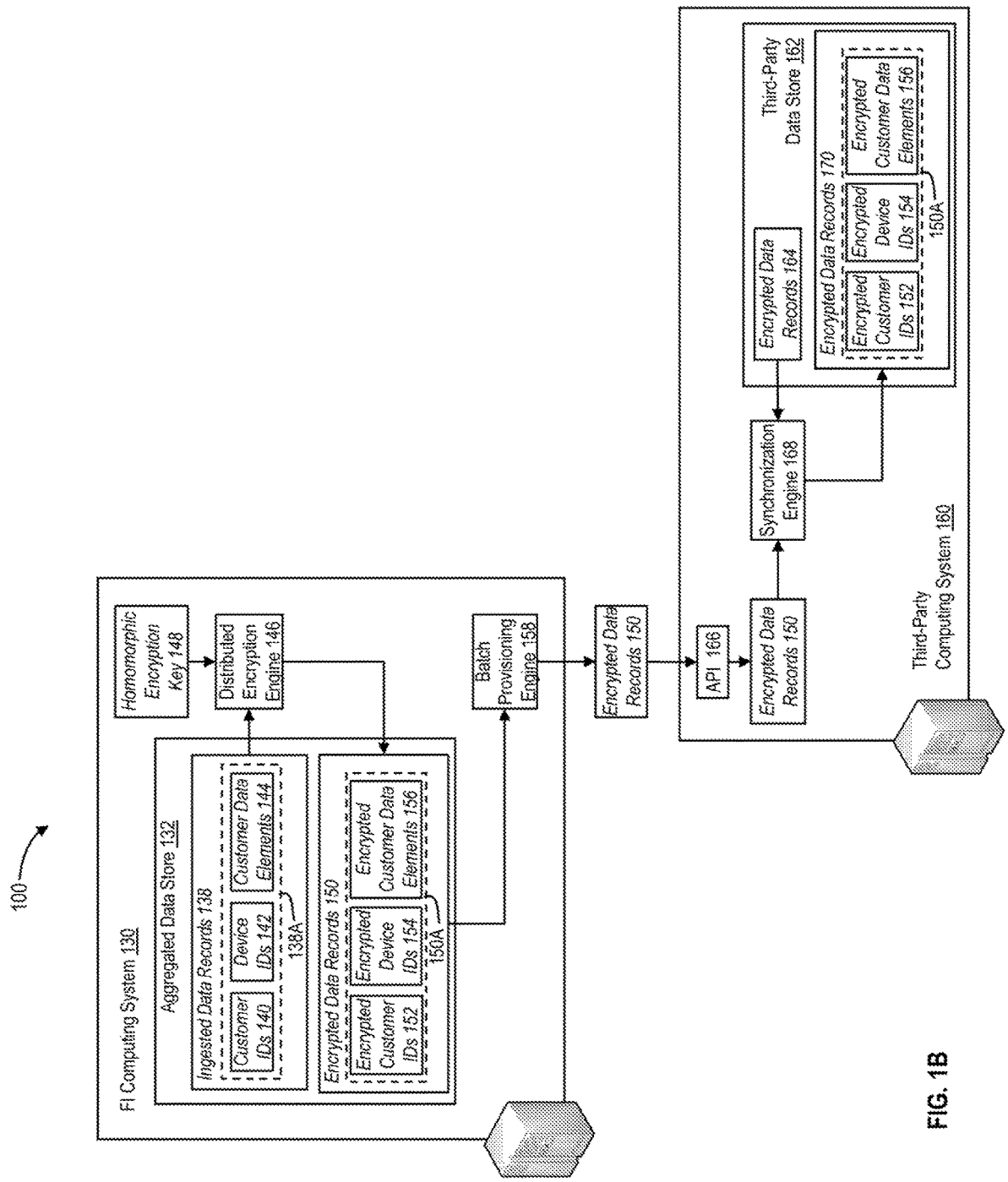
Figure 1C:
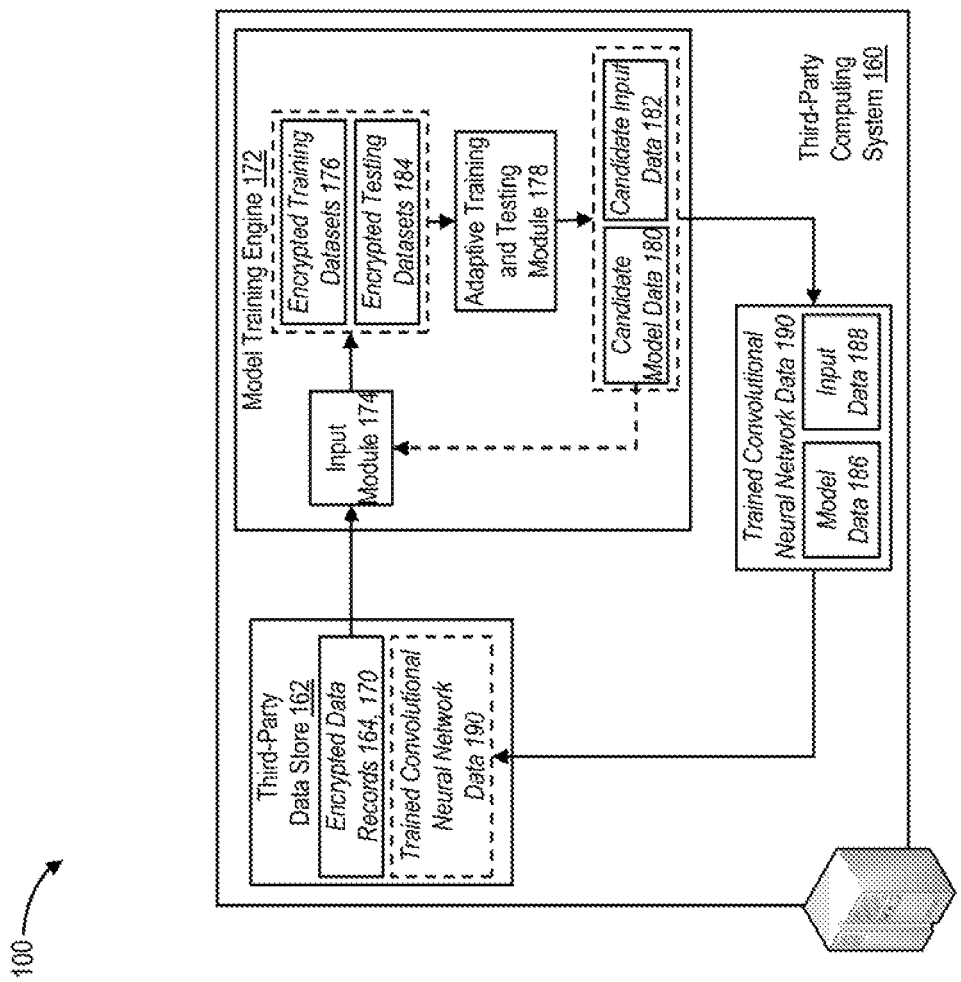

Certain of these additional exemplary processes, which adaptively train and deploy a convolutional neural network model against homomorphically encrypted training datasets, and which ingest additional homomorphically encrypted customer input datasets and generate homomorphically encrypted output data characterizing the predicted credit score of the corresponding customer, may enable the publicly accessible, third-party computing cluster to perform operations on homomorphically encrypted elements of confidential data (e.g., via the implementation of the parallelized, fault-tolerant distributed computing and analytical protocols described herein across clusters of GPUs and/or TPUs), while maintaining the confidentiality and privacy of the confidential training or input data. These exemplary processes may, for example, be implemented in addition to, or as alternative to, processes through which the computing systems of the publicly accessible, third-party computing cluster maintain locally unencrypted elements of confidential data received from the FI computing systems (or a decryption key associated with the FI computing systems), adaptively train one or more machine learning or artificial intelligence processes using unencrypted training datasets, and that predict the customer credit score based on an application of one or more trained machine learning or artificial intelligence processes to unencrypted input datasets. Further, one or more of the exemplary processes described herein provide, to a customer of the financial institution via one or more digital interfaces presented at a customer device, a real-time indication of a predicted credit score during a current temporal interval, or a predicted credit score during discrete, future temporal intervals, may enable to the customer to understand an impact of certain behaviors or decisions on the current credit score and further, to identify an impact of a future, contemplated action on that current credit score.

a. Exemplary Processes for Training Artificial Intelligence Processes Using Encrypted Data within a Distributed Computing Environment FIGS. 1A, 1B, and 1C illustrate components of an exemplary computing environment 100, in accordance with some exemplary embodiments. For example, as illustrated in FIG. 1, environment 100 may include one or more source computing systems 110, such as, but not limited to, internal source system 110A and external source system 110B, one or more computing systems associated with a financial institution, such as, but not limited to, financial institution (FI) computing system 130, and one or more computing systems associated with a third party, such as, not limited to third-party computing system 160. In some instances, each of source computing systems 110 (including internal source system 110A and external source system 110B), each of the FI computing systems (including FI computing system 130), and each of the third-party computing systems (including third-party computing system 160) may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source computing systems 110 (including internal source system 110A and external source system 110B), FI computing system 130, third-party computing system 160, and the additional, or alternate, ones of the FI and third-party computing systems within environment 100 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source computing systems 110 (including internal source system 110A and external source system 110B), FI computing system 130, third-party computing system 160, and the additional, or alternate, ones of the FI and third-party computing systems may also include a communications interface, such as one or more wireless transceivers, coupled to the one or more processors for accommodating wired or wireless internet communication with other computing systems and devices operating within environment 100.

Further, in some instances, source computing systems 110 (including internal source system 110A and external source system 110B), FI computing system 130, and third-party computing system 160 may each be incorporated into a respective, discrete computing system. In additional, or alternate, instances, one or more of source computing systems 110 (including internal source system 110A and external source system 110B), FI computing system 130, and third-party computing system 160 may correspond to a distributed computing system having multiple computing components distributed across an appropriate computing network, such as communications network 120 of FIG. 1A. By way of example, FI computing system 130 may be implemented as a distributed FI computing system that includes computing components associated with the financial institution (e.g., additional, or alternate, ones FI computing systems within environment 100) and distributed across communications network 120 and further, third-party computing system 160 may be implemented as a distributed third-party computing system that includes computing components associated with the third party (e.g., additional, or alternate, ones of the third-party computing systems within environment 100) and distributed across communications network 120.

For example, FI computing system 130 may correspond to a distributed or cloud-based computing cluster associated with, and maintained by, the financial institution, and the third-party computing system 160 may corresponding to a publicly accessible, distributed or cloud-based computing cluster, such as a computing cluster maintained by Microsoft Azure™, Amazon Web Services™, Google Cloud™, or another third-party provider. In some instances, each of FI computing system 130 and third-party computing system 160 may include components, such as those described herein (not illustrated in FIG. 1A), configured to implemented one or more parallelized, fault-tolerant distributed computing and analytical processes, such as those processes provisioned by the Apache Spark™ distributed, cluster-computing framework or the Databricks™ analytical platform. Further, and in addition to the CPUs described herein, the distributed components of FI computing system 130, and the distributed components of third-party computing system 160, may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Through an implementation of the parallelized, fault-tolerant distributed computing and analytical protocols described herein, the distributed components of FI computing system 130 may perform any of the exemplary processes described herein in parallel to homomorphically encrypt one or more elements of confidential data associated with customers of the financial institution using a homomorphic encryption key, and to decrypt one or more homomorphically encrypted elements of confidential data using a corresponding homomorphic decryption key. Further, and through an implementation of the parallelized, fault-tolerant distributed computing and analytical protocols described herein, the distributed components of third-party computing system 160 may perform operations in parallel that not only train adaptively a machine learning or artificial intelligence process (e.g., the convolutional neural network model described herein) using homomorphically encrypted training and testing datasets, but also apply the adaptively trained machine learning or artificial intelligence process to homomorphically encrypted input datasets and generate, in real time, homomorphically encrypted elements of output data indicative of a predicted credit score of a customer of the financial institution. The implementation of the parallelized, fault-tolerant distributed computing and analytical protocols described herein across the one or more GPUs or TPUs included within the distributed components of third-party computing system 160 may, in some instances, accelerate the training, and the post-training deployment, of the machine-learning and artificial-intelligence process when compared to a training and deployment of the machine-learning and artificial-intelligence process across comparable clusters of CPUs capable of processing a single operation per clock cycle.

Referring back to FIG. 1A, each of source computing systems 110 may maintain, within corresponding tangible, non-transitory memories, a data repository that includes confidential data associated with the customers of the financial institution. For example, internal source system 110A may be associated with, or operated by, the financial institution, and may maintain, within the corresponding one or more tangible, non-transitory memories, a source data repository 112 that includes one or more elements of internal customer data 114. In some instances, internal customer data 114 may include confidential data that identifies or characterizes one or more customers of the financial institution and interactions between these customers and the financial institution, and examples of the confidential data include, but are not limited to, customer profile data, account data, or transaction data.

The customer profile data may include, but is not limited to, names, addresses, and other elements of contact data for customers of the financial institution, demographic data characterizing these customers (e.g., ages, occupations, marital status, etc.), and other data characterizing the customers' relationships with the financial institution. Further, in some examples, the account data may identify and characterize one or more financial products or financial instruments issued by the financial institution to corresponding ones of the customers. Examples of these financial products or financial instruments may include, but are not limited to, one or more deposit accounts issued to corresponding ones of the customers, one or more credit-card accounts issued to corresponding ones of the customers by the financial institutions, one or more brokerage or retirements accounts issued to corresponding ones of the customers by the financial institutions and one or more home mortgages, auto loans, or other secured or unsecured lines of credit issued to corresponding ones of the customers by the financial institution. Further, the account data may include, for each of the financial products or instruments provisioned to corresponding ones of the customers, one or more identifiers of the financial product or instrument (e.g., an account number, expiration data, card-security-code, etc.) and additional information characterizing a balance or current status of the financial product or instrument (e.g., payment due dates or amounts, delinquent accounts statuses, etc.).

The transaction data may, in some instances, include information identifying one or more initiated, settled, or cleared transactions involving respective ones of the customers and corresponding ones of the issued financial products or instruments. Examples of these transactions include, but are not limited to, purchase transactions, bill-payment transactions, electronic funds transfers, currency conversions, purchases of securities, derivatives, or other tradeable instruments, electronic funds transfer (EFT) transactions, peer-to-peer (P2P) transfers or transactions, or real-time payment (RTP) transactions. The disclosed embodiments are, however, not limited to these examples of customer profile, account, or transaction data, and in other instances, internal customer data 114 may include any additional or alternate elements of data identify and characterizing the customers and their relationships or interactions with the financial institution.

Further, external source system 110B may be associated with, or operated by, one or more judicial, regulatory, governmental, or reporting entities external to, and unrelated to, the financial institution, and external source system 110B may maintain, within the corresponding one or more tangible, non-transitory memories, a source data repository 116 that includes one or more elements of external customer data 118. For example, external source system 110B may be associated with, or operated by, a reporting entity, such as a credit bureau, and external customer data 118 may include reporting data that characterizes, among other things, a current credit score of one or more of the customers of the financial institution (e.g., a credit score during a current temporal interval) and one or more prior credit scores of these customers (e.g., a credit score during one or more corresponding prior temporal intervals). The elements of reporting data may also include, among other things, additional demographic data (e.g., a marital status, data characterizing a housing type associated with the one or more customers, such as apartment home or single family home, etc.) and data characterizing an employment or an income of one or more of the customers. The disclosed embodiments are, however, not limited to these examples of external data, and in other instances, external customer data 118 may the FI computing systems may include any additional or alternate elements of data associated with the customer and generated by the judicial, regulatory, governmental, or regulatory entities, such as one or more additional elements of the exemplary customer profile, account, or transaction data described herein.

In some instances, each of FI computing system 130 and third-party computing system 160 may perform operations that establish and maintain a centralized data repository within corresponding ones of the tangible, non-transitory memories. For example, as illustrated in FIG. 1A, FI computing system 130 may establish and maintain an aggregated data store 132 that includes, among other things, elements of the customer profile, account, transaction, and reporting data associated with one or more of the customers of the financial institution, and third-party computing system 160 may establish and maintain a third-party data store 162 that includes, among other things, encrypted data records 164, which may be generated by, and received from, FI computing system 130 using any of the exemplary processes described herein. In some examples, aggregated data store 132 and third-party data store 162 may correspond to a data lake, a data warehouse, or another centralized repository established and maintained, respectively, by the distributed components of FI computing system 130 and the distributed components of third-party computing system 160, e.g., through a Hadoop™ distributed file system.

For example, FI computing system 130 may execute one or more application programs, elements of code, or code modules that, in conjunction with the corresponding communications interface, establish a secure, programmatic channel of communication with each of source systems 110, including internal source system 110A and external source system 110B, across network 120, and may perform operations that access and obtain all, or a selected portion, of the elements of customer profile, account transaction, or reporting data maintained by each of source systems 110. As illustrated in FIG. 1A, internal source system 110A may perform operations that obtain all, or a selected portion, of internal customer data 114 (e.g., the customer profile, account, or transaction data described herein) from source data repository 112, and transmit the obtained portions of internal customer data 114 across network 120 to FI computing system 130. External source system 110B may also perform operations that obtain all, or a selected portion, of external customer data 118 (e.g., the reporting data described herein) from source data repository 116, and transmit the obtained portions of external customer data 118 across network 120 to FI computing system 130.

In some instances, and prior to transmission across network 120 to FI computing system 130, internal source system 110A and external source systems 110B may encrypt respective portions of internal customer data 114 and external customer data 118 using a corresponding encryption key, such as, but not limited to, a corresponding public cryptographic key associated with FI computing system 130. Further, although not illustrated in FIG. 1A, each additional, or alternate, one of source systems 110 may perform any of the exemplary processes described herein to obtain, encrypt, and transmit a portion of the customer profile, account, transaction, or reporting data maintained locally maintained by source systems 110 across network 120 to FI computing system 130.

A programmatic interface established and maintained by FI computing system 130, such as application programming interface (API) 134, may receive the portions of internal customer data 114 from internal source system 110A and the portions of external customer data 118 from external source system 110B (and the portions of customer profile, account, transaction, or reporting data received from additional, or alternate, ones of source systems 110). As illustrated in FIG. 1A, API 134 may route the portions of internal customer data 114 and external customer data 118 (and the additional, or alternate, portions of the customer profile, account, transaction, or reporting data) to a data ingestion engine 136 executed by FI computing system 130. As described herein, the portions of internal customer data 114 and external customer data 118 (and the additional, or alternate, portions of the customer profile, account, transaction, or reporting data) may be encrypted, and executed data ingestion engine 136 may perform operations that decrypt each of the encrypted portions of internal customer data 114 and external customer data 118 (and the additional, or alternate, portions of the customer profile, account, transaction, or reporting data) using a corresponding decryption key, such as a private cryptographic key associated with FI computing system 130 (not illustrated in FIG. 1A).

Executed data ingestion engine 136 may also perform operations that store the portions of internal customer data 114 and external customer data 118 (and the additional, or alternate, portions of the customer profile, account, transaction, or reporting data) within one or more data records of aggregated data store 132, e.g., as ingested data records 138. In some instances, ingested data records 138 may include a plurality of discrete, structured or unstructured data records, and each of the data records may be associated with, and may maintain data characterizing, a corresponding one of the customers of the financial institution. For example, and for a particular customer of the financial institution, data record 138A of ingested data records 138 may include one of more identifiers 140 of the particular customer, one or more identifiers 142 of a device associated with the particular customer, and elements 144 of customer profile, account, transaction, or reporting data that characterize the particular customer (e.g., as received from one or more of source systems 110, such as internal source system 110A and external source system 110B). Examples of customer identifier 140 may include, but are not limited to, an alphanumeric login credential of the particular customer or a biometric credential of that particular customer (e.g., a digital facial image, a thumbprint scan, etc.). and examples of device identifiers 142 may include, but are not limited to, a network address of the customer device (e.g., an Internet Protocol (IP) address, a media access control (MAC) address, etc.) or a cryptogram associated with an application program executed by the customer device.

In some examples, FI computing system 130 may receive the elements of customer profile, account, transaction, or reporting data that characterize the customers of the financial institution (e.g., hereinafter, "customer data") from source systems 110, and may store the received customer data within corresponding portions of aggregated data store 132 (e.g., to "ingest" the discrete elements of customer data) at predetermined temporal intervals, such as, but not limited to, on hourly basis, on a daily basis, on a weekly basis, or in accordance with any additional, or alternate, temporal interval appropriate to the elements of customer data described herein. Further, aggregated data store 132 may correspond to a data lake, a data warehouse, or another centralized repository established and maintained, by the distributed components of FI computing system 130 (e.g., through a Hadoop™ distributed file system), and the distributed components of FI computing system 130 may execute data ingestion engine 136 and perform any of the exemplary processes described herein to ingest the received elements of customer data into the corresponding portions of aggregated data store 132.

Referring to FIG. 1B, a distributed encryption engine 146 executed by FI computing system 130 may perform operations that access aggregated data store 132, and obtain one or more of ingested data records 138, which include elements of customer data that identify and characterize corresponding customers of the financial institution and the interactions between these customers and the financial institution, from aggregated data store 132. For example, executed distributed encryption engine 146 may obtain, from aggregated data store 132, data records 138A that includes one or more identifiers 140 of a particular customer of the financial institution, one or more identifiers 122 of a device associated with that particular customer, and elements 144 of customer data that characterize the particular customer, as described herein. Further, although not illustrated in FIG. 1B, each additional, or alternate, one of ingested data records 138 obtained by executed distributed encryption engine 146 may include one or more additional identifiers of a corresponding one of the customer, one or more additional identifiers of a device associated with that corresponding customer, and additional elements of customer data (e.g., profile, account, transaction, or reporting data) that characterize the corresponding customer.

Executed distributed encryption engine 146 may perform operations that obtain a homomorphic encryption key 148 associated with FI computing system 130 (and as such, with the financial institution) from one or more of the tangible, non-transitory memories of FI computing system 130. Executed distributed encryption engine 146 may also perform operations that encrypt each of the data records obtained from ingested data records 138 using homomorphic encryption key 148, and that store the homomorphically encrypted data records within a corresponding portion of aggregated data store 132, e.g., within encrypted data records 150. In some instances, homomorphic encryption key 148 may include, but is not limited to, a private homomorphic key associated with, or generated by, FI computing system 130. Further, each of the homomorphically encrypted data records within encrypted data records 150 may be associated with a corresponding one of the customers of the financial institution, and each of the homomorphically encrypted data records may include, for that corresponding customer, one or more homomorphically encrypted customer identifiers, one or more homomorphically encrypted device identifiers, and homomorphically encrypted elements of the customer data described herein.

By way of example, and as described herein, data record 138A may include one of more identifiers 140 of a particular customer of the financial institution, one or more identifiers 142 of a device associated with the particular customer, and elements 144 of customer data that characterize the particular customer (e.g., as received from one or more of source systems 110, such as internal source system 110A and external source system 110B). In some instances, executed distributed encryption engine 146 may obtain data record 138A from aggregated data store 132 (e.g., as maintained within ingested data records 138), and may perform operations that encrypt data record 138A using homomorphic encryption key 148 and generate encrypted data record 150A associated with the particular customer, which executed distributed encryption engine 146 may store within a portion of aggregated data store 132, e.g., within encrypted data records 150. For example, and as illustrated in FIG. 1B, encrypted data record 150A may include one of more homomorphically encrypted identifiers 152 of the particular customer, one or more homomorphically encrypted identifiers 154 of the device associated with the particular customer, and homomorphically encrypted elements 156 of customer data that characterize the particular customer. Further, executed distributed encryption engine 146 may perform any of the exemplary processes described herein to encrypt each of the additional, or alternate data records obtained from aggregated data store 132 using homomorphic encryption key 148, to store corresponding ones of the additional, or alternate, encrypted data records within a portion of aggregated data store 132, e.g., within encrypted data records 150.

In some instances, homomorphic encryption key 148 may be consistent with, and generated in accordance with, a corresponding homomorphic encryption scheme, such as, but not limited to, a fully homomorphic encryption scheme facilitating arbitrary computations on ciphertext and generating encrypted results that, when decrypted, match the results of the arbitrary computations performed on corresponding elements of plaintext. Examples of these fully homomorphic encryption schemes include, but are not limited to, a TFHE encryption scheme that facilitates verifiable computations on integer ciphertext and a SEAL encryption scheme or a PALISADE encryption scheme that facilitates verifiable computations on floating-point ciphertext. Additionally, in some instances, executed distributed encryption engine 146 may perform any of the exemplary processes described herein to access and encrypt the data records maintained within aggregated data store 132 at predetermined temporal intervals (e.g., on an hourly basis, on a daily basis, on a weekly basis, or in accordance with any additional, or alternate, temporal interval appropriate to the elements of customer data) or in response to a detected occurrence of a triggering event associated with aggregated data store 132 (e.g., a determination that a number of unencrypted data records within aggregated data store 132 exceeds a threshold number, etc.).

Further, in some examples, the distributed components of FI computing system 130 may execute distributed encryption engine 146, and may perform parallel processing to homomorphically encrypt the ingested data records maintained within aggregated data store 132 (e.g., ingested data records 138) based on an application of a distributed, homomorphic encryption function to ingested data records 138. The parallel implementation of distributed encryption engine 146 by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.). Certain of these exemplary processes, which integrate a fully homomorphic encryption scheme into a parallelized, fault-tolerant distributed computing and analytical protocol, may enable the distributed components of FI computing system 130 (e.g., including one or more of the GPUs and TPUs described herein) to perform computations on large datasets while preserving customer privacy, and to accelerate homomorphic computations involving these large datasets via an efficient parallelization across the distributed components of FI computing system 130.

Referring back to FIG. 1B, a batch provisioning engine 158 executed by FI computing system 130 may access aggregated data store 132, and obtain all, or a selected portion, of encrypted data records 150, including encrypted data record 150A. Further, executed batch provisioning engine 158 may perform operations that cause FI computing system 130 to transmit encrypted data records 150 across network 120 to third-party computing system 160. In some instances, executed batch provisioning engine 158 may access and transmit encrypted data records across network 120 to third-party computing system 160 in batch mode at predetermined temporal intervals (e.g., on an hourly basis, on a daily basis, on a weekly basis, or in accordance with any additional, or alternate, temporal interval appropriate to the encrypted data records) or in response to a detected occurrence of a triggering event associated with aggregated data store 132 (e.g., a determination that a number of encrypted data records within aggregated data store 132 exceeds a threshold number, etc.).

A programmatic interface established or maintained by third-party computing system 160, such as application programming interface (API) 166, may receive encrypted data records 150 from FI computing system 130, and may route encrypted data records 150 to a data synchronization engine 168 executed by third-party computing system 160. In some examples, executed data synchronization engine 168 may perform operations that synchronize encrypted data records 150 with one or more additional encrypted data records maintained within third-party data store 162 (e.g., encrypted data records 164), and that store a synchronized portion of encrypted data records 150 within third-party data store 162 (e.g., to "ingest" the synchronized portion of encrypted data records 150 into third-party data store 162).

For example, and as described herein, third-party data store 162 may correspond to a data lake, a data warehouse, or another centralized repository established and maintained, by the distributed components of third-party computing system 160 (e.g., through a Hadoop™ distributed file system), and the distributed components of third-party computing system 160 may include one or more GPUs or TPUs configured to operate as a discrete cluster implementing one or more parallelized, fault-tolerant distributed computing and analytical processes, such as those described herein (e.g., the Databricks™ analytical platform, etc.). In some instances, the distributed components of third-party computing system 160 may execute data synchronization engine 168 and perform any of the exemplary processes described herein in parallel to synchronize encrypted data records 150 with the additional encrypted data records maintained within third-party data store 162, and to ingest the synchronized portion of encrypted data records 150 into third-party data store 162.

As illustrated in FIG. 1B, executed data synchronization engine 168 may perform operations that access the one or more additional encrypted data records maintained within third-party data store 162, e.g., encrypted data records 164. For example, encrypted data records 164 may include one or more encrypted data records ingested previously into third-party data store 162 using any of the exemplary processes described herein. In some instances, executed data synchronization engine 168 may perform a synchronization process (such as, but not limited to, a "delta" synchronization process) that decomposes encrypted data records 150 into: (i) a first subset of encrypted data records 150 that were ingested previously into third-party data store 162 and as such, represent duplicates of encrypted data records 164; and (ii) a second subset of encrypted data records 150 that are distinct from encrypted data records 164 and as such, that await ingestion into, and replication within, third-party data store 162.

By way of example, each of encrypted data records 164 may be associated with a corresponding customer of the financial institution, and may include one or more homomorphically encrypted identifiers of the corresponding customer, one or more homomorphically encrypted identifiers of a device associated with the corresponding customer, and homomorphically encrypted elements of customer data associated with the corresponding customer. In some instances, executed data synchronization engine 168 may perform operations that access a particular encrypted data record within the received portion of encrypted data records 150, and obtain, from that particular encrypted data record, one or more of the homomorphically encrypted customer identifiers, one or more of the homomorphically encrypted device identifiers, and the homomorphically encrypted elements of customer data. Executed data synchronization engine 168 may also perform operation that determine whether any of encrypted data records 164 (e.g., as previously ingested into third-party data store 162) include the one or more homomorphically encrypted customer identifiers or the one or more homomorphically encrypted device identifiers obtained from the particular encrypted data record.

If executed data synchronization engine 168 were to establish that none of encrypted data records 164 (e.g., as previously ingested into third-party data store 162) include the one or more homomorphically encrypted customer identifiers or the one or more homomorphically encrypted device identifiers obtained from the particular encrypted data record, executed data synchronization engine 168 may determine that the particular encrypted data record awaits ingestion into, and replication within, third-party data store 162, and may package the particular encrypted data record into a corresponding portion of encrypted data records 170, e.g., the second subset described herein. Alternatively, if executed data synchronization engine 168 were to establish that at least one of encrypted data records 164 includes the one or more homomorphically encrypted customer identifiers or the one or more homomorphically encrypted device identifiers obtained from the particular encrypted data record, executed data synchronization engine 168 may perform further operations that determine whether the at least one of encrypted data records 150 includes the homomorphically encrypted elements of customer data obtained from the particular encrypted data record.

In some instances, if executed data synchronization engine 168 were to establish that the at least one of encrypted data records 164 fails to include the homomorphically encrypted elements of customer data obtained from the particular encrypted data record, executed data synchronization engine 168 may confirm that the particular encrypted data record awaits ingestion into, and replication within, third-party data store 162, and may package the particular encrypted data record into the corresponding portion of encrypted data records 170. Alternatively, if executed data synchronization engine 168 were to establish that the at least one of encrypted data records 164 includes the homomorphically encrypted elements of customer data obtained from the particular encrypted data record, executed data synchronization engine 168 may establish that the particular encrypted data record represents a duplicate of the at least one of encrypted data records 150 and as such, was ingested previously into, and replicated within, third-party data store 162. Based on the determination that the particular encrypted data record represents a duplicate of at least one of encrypted data records 164, executed data synchronization engine 168 may perform operations that discard particular encrypted data record. Further, executed data synchronization engine 168 may perform any of the exemplary processes described herein to synchronize each of the additional, or alternate, encrypted data records within the received portion of encrypted data records 164 against each of encrypted data records 164 ingested previously into, and maintained within, third-party data store 162.

Referring back to FIG. 1B, executed data synchronization engine 168 may perform operations that store encrypted data records 170, which include one or more encrypted data records awaiting ingestion into, and replication within, third-party data store 162, within a corresponding portion of third-party data store 162. As described herein, each of the encrypted data records of encrypted data records 170 may be associated with a corresponding customer of the financial institution, and may include homomorphically encrypted elements of data that identify and characterize the corresponding customer. For example, as illustrated in FIG. 1B, encrypted data records 170 may include encrypted data record 150A, which may be associated with a particular customer of the financial institution, and as described herein, encrypted data record 150A may include one of more homomorphically encrypted identifiers 152 of the particular customer, one or more homomorphically encrypted identifiers 154 of the device associated with the particular customer, and homomorphically encrypted elements 156 of customer data that characterize the particular customer. The disclosed embodiments are, however, not limited to encrypted data records that include these exemplary elements of homomorphically encrypted data, and in other instances, encrypted data record 150A and each additional, or alternate, one of encrypted data records 170 may include any other elements of homomorphically encrypted data that identifies and characterizes, or is associated with, customers of the financial institution.

In some instances, described below in reference to FIG. 1C, third-party computing system 160 may perform operations that adaptively train a machine learning or artificial intelligence process to predict credit scores of customer of the financial institution during a current temporal interval, or during one or more future temporal intervals, based on secure, homomorphic computations involving training and testing datasets selected from the homomorphically encrypted data records ingested into, and maintained within, third-party data store 162, e.g., one or more of encrypted data records 164 or encrypted data records 170. For example, the distributed computing components of third-party computing system 160 (e.g., that include one or more GPUs or TPUs configured to operate as a discrete computing cluster) may perform any of the exemplary processes described herein to adaptively train the machine learning or artificial intelligence process in parallel through an implementation of one or more parallelized, fault-tolerant distributed computing and analytical processes (e.g., the Apache Spark™ distributed, cluster-computing framework, the Databricks™ analytical platform, etc.). Based on an outcome of these adaptive training processes, third-party computing system 160 may generate model coefficients, parameters, thresholds, and other modelling data that collectively specify the trained machine learning or artificial intelligence process, and may store the generated model coefficients, parameters, thresholds, and modelling data within a portion of the one or more tangible, non-transitory memories, e.g., within third-party data store 162.

In some examples, the machine-learning and artificial-intelligence process may include an artificial, feed-forward neural network model, such as, but not limited to, a convolutional neural network model characterized an input layer, and output layer, and one or more hidden layers (e.g., convolutional layers that include one or more activation layers, pooling layers, or normalization layers). Further, one or more of the hidden layers of the convolutional neural network model, such as the activation or pooling layers, may associated with one or more non-linear processes, such as an evaluation of a nonlinear activation function. The convolutional neural network model may, for example, define the nonlinear activation function in terms of the sigmoid function (e.g., $y(x)=1/1+e^{-x}$) or in terms of one or more exponential functions (e.g., $y(x)=e^{\beta_0+\beta_1 x_1+\beta_2 x_2}$).

Further, the homomorphic computations that facilitate the adaptive training and improvement of the convolutional neural network model may be tailored to, or selected for consistency with, the homomorphic encryption scheme associated with the encrypted training datasets. For example, although certain of the homomorphic encryption schemes described herein (e.g., the SEAL or PALISADES encryption scheme) facilitate verifiable computations on floating-point ciphertext and support operations that include, but are not limited to, floating-point addition and multiplication, these homomorphic encryption schemes may be incapable of supporting certain of the non-linear processes (e.g., an evaluation of a nonlinear activation function) or comparative processes (e.g., maximization or minimization) performed by third-party computing system 160 during the adaptive training of the convolutional neural network model.

In some instances, and based on restrictions imposed by the homomorphic encryption scheme, the operations associated with the application of the convolutional neural network model to the homomorphically encrypted training or testing datasets may be represented, or decomposed into, corresponding floating-point addition or multiplication operations applicable to homomorphically encrypted data. Examples of these operations include, but are not limited to, an evaluation of a nonlinear activation function during an activation or pooling process of the convolutional neural network model, or certain minimization or maximization processes performed during a pooling or rectification process of the convolutional neural network model/

For example, and prior to the performance of the homomorphic computations described herein, certain of these maximization or minimization operations may be approximated as a scalar multiple of an output of the pooling or rectification functions evaluated within one or more artificial neural network models. Further, and by way of example, a non-linear sigmoid activation function associated with the convolutional neural network model may be approximated by the Taylor series expansion having a specified degree, e.g., $y(x)=\frac{1}{2}+x/4+x^3/48+x^5/480$. In other examples, described herein, the convolution neural network model may define a non-linear activation function in terms of an exponential function (e.g., $y(x)=ee^{\beta_0 x_1+\beta_2 x_2}$), which may be approximated as polynomials using appropriate Taylor or Maclaurin expansions (e.g., that require only addition or multiplication processes). The disclosed embodiments are, however, not limited to these exemplary representations or decompositions, and in other instances, any additional or alternate operations associated with the convolutional neural network model may be represented by, or decomposed into, corresponding floating-point addition operations, floating-point multiplication operations, or any additional or other operations consistent with the homomorphic encryption scheme, including integer-based addition or multiplication operations.

Referring back to FIG. 1C, a training engine 172 executed by third-party computing system 160 may access one or more homomorphically encrypted data records associated with a plurality of customers of the financial institution, e.g., portions of encrypted data records 164 and encrypted data records 170 within third-party data store 162. In some instances, a input module 174 of executed training engine 172 may perform operations that parse, split, or decompose the homomorphically encrypted data records into a plurality of encrypted training datasets 176 that, when provisioned to an input layer of the convolutional neural network model, enable executed training engine 172 to train adaptively the convolutional neural network model to predict credit scores of the customers of the financial institution during the current and future temporal intervals.

Each of encrypted training datasets 176 may include, but is not limited to, elements of the homomorphically encrypted customer data associated with each of a predetermined number of customers of the financial institution (e.g., five or six customers across multiple geographic regions, etc.). In some instances, each of the predetermined number of customer may be associated with a subset of encrypted training datasets 176 that include a predetermined number of discrete, homomorphically encrypted datasets of various temporal relevance and of various composition. By way of example, and for a corresponding one of the customers, the subset of encrypted training datasets 176 may one or more discrete encrypted training datasets that include elements of the homomorphically encrypted customer data (e.g., elements of homomorphically encrypted customer profile, account, transaction, or reporting data) associated with a current temporal interval, and additional encrypted training datasets that include elements of the homomorphically encrypted customer data associated with corresponding prior temporal intervals (e.g., one month, three months, six months, etc.). Further, in some examples, the particular type, or number, of the elements of the homomorphically encrypted customer data included within each of the customer-specific encrypted training datasets may vary across the datasets or the customers.

As described herein, executed training engine 172 may perform operations that adaptively train the convolutional neural network model to predict, in real-time, not only a credit score of a customer of the financial institution during a current temporal interval, but also an expected credited score of that customer during one or more future temporal intervals, such as, but not limited to, one month, three months, or six months into the future. In some instances, to facilitate the real-time prediction of the credit score, each of the customer-specific subsets of encrypted training datasets 176 may include, but are not limited to, elements of the homomorphically encrypted customer data (e.g., as obtained from encrypted data records 164 or encrypted data records 170) associated with, among other things, a payment history of the corresponding customer, an amount owed by the corresponding customer across various credit accounts, a credit history of the corresponding customer, an accumulation of new credit by the corresponding customer, or types of credit accounts held by the customer.

For example, the elements of customer data associated with the payment history of the corresponding customer may include, but are not limited to, an increase or decrease in payment for certain financial products held by the corresponding customer (e.g., credit cards issued by the financial institution, mortgages, educational loans, etc.), missed payments for these financial products, or variations in repayment across types of debt held by the corresponding customer (e.g., revolving loans, installment loans, etc.). Further, the elements of customer data associated with the amount owed by the corresponding customer across various credit accounts may include, but are not limited to, a credit utilization of the corresponding customer (e.g., instances in which the corresponding customer reached a credit limit, or a specified portion of the credit limit, etc.) or a comparison between payments across all credit accounts held by the corresponding customer and payments across corresponding ones of the credit accounts. In some examples, the homomorphically encrypted elements of customer profile, account, transaction, or reporting data that characterize the credit history of the corresponding customer may characterize, among other things, account aging, decisions regarding account closing, account usage (e.g., active or dormant, etc.) of the corresponding customer.

Further, in some examples, the elements of customer data associated with the accumulation of new credit by the corresponding customer may identify or characterize, among other things, new credit accounts opened by the corresponding customer, a consolidation of credit by the corresponding customer, variations in credit accumulated across all credit accounts or accumulated in a single credit account, or credit inquiries of the corresponding customer. Additionally, the elements of customer data associated with the types of credit accounts held by the corresponding customer may identify and characterize, among other things, installment loans (e.g., auto loans, educational loans, etc.) held by the corresponding customer, home mortgage loans held by the corresponding customer, credit cards issued by other financial institutions, retailers, or gas stations to the corresponding customer, unpaid loans taken on by collection agencies or debt buyers, information characterizing rental or ownership of property, or a lack of a certain type of credit by the corresponding customer.

The disclosed embodiments are, however, encrypted training sets characterized by these exemplary compositions, and in other examples, the subset of encrypted training datasets 176 associated with a corresponding customer of the financial institution may include additional, or alternate portions of the homomorphically encrypted customer data associated with the payment history of the corresponding customer, the amount owed by the corresponding customer across various credit accounts, the credit history of the corresponding customer, the accumulation of new credit by the corresponding customer, and the types of credit accounts held by the corresponding customer. In some examples, a composition of the encrypted training datasets may vary across the customers of the financial institution, and may include additional, or alternate, ones of the homomorphically encrypted, customer-specific elements of customer profile, account, transaction, or reporting data maintained within, and obtained from, encrypted data records 164 and 170 maintained within third-party data store 162.

One or more of the subset of encrypted training datasets 176 associated with the corresponding customer may also include additional, or alternate, elements of homomorphically encrypted information relevant to the real-time prediction of the corresponding credit score, such as a credit score for the particular customer during a current, or one or more prior, temporal intervals. In some examples, one or more of the subset of encrypted training datasets 176 associated with the corresponding customer may include homomorphically encrypted data identifying and characterizing a specific transaction involving the corresponding customer and a financial product held by the corresponding customer (e.g., an initiated or proposed purchase transaction, etc.). Additionally, or alternatively, one or more of the subset of encrypted training datasets 176 associated with the corresponding customer may include a proposed modification to a payment on one or more financial products held by the corresponding customer (e.g., credit card accounts, home mortgages, educations loans, etc.), or a proposed modification to the utilization of credit by the corresponding customer (e.g., a requested increase to a credit limit, a requested consolidation of credit, etc.). Further, in some examples, each of the subset of encrypted training datasets 176 associated with the corresponding customer may also include elements of homomorphically encrypted data identifying expected outcomes or targets across multiple temporal intervals (e.g., a current credit score of the corresponding customer during a current temporal interval, prior credit scores of the corresponding customer during prior temporal intervals, etc.).

By way of example, executed input module 174 may generate, for each of the predetermined number of the customers, a corresponding subset of encrypted training datasets 176 that includes twenty discrete, homomorphically encrypted training datasets. As described herein, and as the predetermined number of customers may include five or six customers of the financial institution, executed input module 174 may perform any of the exemplary processes described herein to generate a total number of 100 to 120 discrete homomorphically encrypted training datasets, and package each of the 100 to 120 discrete homomorphically encrypted training datasets into a corresponding portions of encrypted training datasets 176, during each training or development cycle.

Referring back to FIG. 1C, executed input module 174 may provide encrypted training datasets 176 as an input to an adaptive training and testing module 178 of executed training engine 172. In some instances, and upon execution by the third-party computing system 160 adaptive training and testing module 178 may perform operations that establish a plurality of nodes of a convolutional neural network (e.g., that "build" the convolutional neural network), which may ingest each of the homomorphically encrypted training datasets within encrypted training datasets 176. Further, and based on the execution of adaptive training and testing module 178, and on the ingestion of each of encrypted training datasets 176 by the established nodes of the convolutional neural network, third-party computing system 160 may perform operations that adaptively train the convolutional neural network model against the homomorphically encrypted elements of training data included within each of encrypted training datasets 176.

In some examples, the distributed components of third-party computing system 160 may execute adaptive training and testing module 178, and may perform any of the exemplary processes described herein in parallel to establish the plurality of nodes of the convolutional neural network and to adaptively train the convolutional neural network model against the homomorphically encrypted elements of training data included within each of encrypted training datasets 176. The parallel implementation of adaptive training and testing module 178 by the distributed components of third-party computing system 160 may, in some instances, be based on an implementation, across the distributed components, of one or more of the parallelized, fault-tolerant distributed computing and analytical protocols described herein (e.g., the Apache Spark™ distributed, cluster-computing framework, etc.).

Through the performance of these adaptive training processes, executed adaptive training and testing module 178 may perform operations that compute one or more candidate model coefficients, candidate model parameters, and candidate thresholds that characterize the trained convolutional neural network model, and package the candidate model coefficients, candidate model parameters, and candidate thresholds into corresponding portions of candidate model data 180. In some instances, candidate model data 180 may also include data specifying the operations and activation functions associated with the input, hidden and output layers of the trained convolutional neural network model (e.g., defined in accordance with the restrictions imposed by the homomorphic encryption scheme, as described above), along with further information that identifies or characterizes the discrete nodes associated with each of the input, hidden, and output layers of the trained convolutional neural network model. Based on the performance of these adaptive training processes, executed adaptive training and testing module 178 may also generate candidate input data 182, which specifies a candidate composition of an encrypted input dataset for the trained convolutional neural network model (e.g., which be provisioned as inputs to the nodes of the input layer).

In some instances, executed input module 174 of training engine 172 may perform any of the exemplary processes described herein to generate a plurality of encrypted testing datasets 184 having compositions consistent with candidate input data 182. By way of example, executed input module 174 may parse candidate input data 182 to obtain the candidate composition of the encrypted input dataset, which not only specifies the elements of the homomorphically encrypted customer data within an encrypted testing dataset, but also a candidate sequence or position of these elements of the homomorphically encrypted customer data within the encrypted input dataset. In some instances, executed input module 174 may perform operations that obtain, from encrypted data records 167 or 170, each of the specified elements of the homomorphically encrypted customer data associated with a predetermined number of additional customers of the financial institution, and that generate, for each of the predetermined number of customers, a customer-specific one of encrypted testing datasets 184 that include the corresponding, customer-specific elements of the homomorphically encrypted customer data ordered in accordance with the candidate sequence or position.

As described herein, the elements of homomorphically encrypted customer data may be associated with a current temporal interval, and additionally or alternatively, with a prior temporal interval (e.g., one month, three months, six months, etc.), and may be associated with, among other things, payment histories of the additional customers, amounts owed by the additional customers across various credit accounts, credit histories of the additional customers, an accumulation of new credit by each of the additional customers, or types of credit accounts held by the additional customers. The encrypted testing datasets 184 may also include, for a corresponding one of the additional customers, homomorphically encrypted data identifying and characterizing a specific transaction involving the corresponding customer and one or more financial products held by the corresponding customer (e.g., an initiated or proposed purchase transaction, etc.), a proposed modification to a payment on one or more financial products held by the corresponding customer (e.g., credit card accounts, home mortgages, educations loans, etc.), or a proposed modification to the utilization of credit by the corresponding customer (e.g., a requested increase to a credit limit, a requested consolidation of credit, etc.).

Further, in some examples, one or more of encrypted testing datasets 184 may include temporal data characterizing a target temporal interval for the predicted credit score, and elements of homomorphically encrypted target data identifying expected outcomes during the target temporal interval (e.g., a homomorphically encrypted credit score during a current temporal interval, homomorphically encrypted credit scores during prior temporal intervals, etc.). The disclosed embodiments are, however, not limited to encrypted testing datasets having these exemplary components, and in other instances, one or more of encrypted testing datasets 184 may include any additional, or alternate, elements of homomorphically encrypted data appropriate to the customers, the financial institution, or the prediction of the credit score during current or future temporal intervals.

In some examples, the additional customers associated with encrypted testing datasets 184 may be different from the those customers associated with encrypted training datasets 176. For instance, these additional customers may be associated with geographic regions different from the geographic regions that characterize the customers associated with encrypted training datasets 176, and additionally, or alternatively, may be associated with demographic parameters that are different from those that characterize the customers associated with encrypted training datasets 176. In other examples, consistent with the disclosed embodiments, encrypted training datasets 176 and encrypted testing datasets 184 may be associated with, and may include elements of homomorphically encrypted customer data characterizing one or more common customers of the financial institution.

Further, in some examples, the homomorphically encrypted elements of customer data included within one or more of encrypted testing datasets 184 may be associated with a temporal interval that differs from, and occurs prior to, a target temporal interval specified by corresponding temporal data within the one or more of encrypted testing datasets 184. For instance, the target temporal interval specified within the one or more of encrypted testing datasets 184 may correspond to a current temporal interval, and corresponding ones of the homomorphically encrypted elements of customer data may be associated with a prior temporal interval, e.g., one month, three months, or six months prior to the current temporal interval. In some instances, the differences between the target temporal interval and the temporal interval associated with the homomorphically encrypted elements of customer data included within the one or more of encrypted testing datasets 184 may enable executed adaptive training and testing module 178 to determine an ability of the trained convolutional neutral network model to accurately predict the customer credit score during one or more future temporal intervals.

Referring back to FIG. 1C, executed input module 174 may provide the plurality of encrypted testing datasets 184 as inputs to executed adaptive training and testing module 178. In some examples, executed adaptive training and testing module 178 may perform operations that apply the trained convolutional neural network model to respective ones of encrypted testing datasets 184 (e.g., based on the candidate model coefficients, candidate model parameters, and candidate thresholds into corresponding portions of candidate model data 180), and that generate elements of homomorphically encrypted output data based on the trained convolutional neural network model to corresponding ones of encrypted testing datasets 184.

As described herein, each of the each of elements of homomorphically encrypted output data may correspond to a homomorphically encrypted credit score, which may be predicted by executed adaptive training and testing module 178 through the application of the trained convolution neural network model to the corresponding one of encrypted testing datasets 184. In some instances, executed adaptive training and testing module 178 may determine whether each of the homomorphically encrypted credit scores matches, and is equivalent to, the element of homomorphically encrypted target data maintained within a corresponding one of encrypted testing datasets 184, and may compute a value of a metric indicative of an accuracy of the trained convolutional neural network model based on, for example, a determine equivalence between the elements of homomorphically encrypted output data and corresponding elements of the homomorphically encrypted target data. By way of example, the computed metric value may correspond to a percentage (e.g., from zero to one hundred) or a fraction (e.g., from zero to unity) of these elements of homomorphically encrypted output data that match, and are equivalent to, the corresponding elements of homomorphically encrypted target data.

In some examples, executed adaptive training and testing module 178 may perform operations that determine whether the computed metric value satisfies one or more threshold requirements for a deployment of the trained convolutional neural network model and a real-time application to homomorphically encrypted customer data. For instance, the one or more threshold requirements may specify a predetermined threshold value for the trained convolutional neural network model or for the homomorphically encrypted target data, e.g., the homomorphically encrypted credit scores, and executed adaptive training and testing module 178 that establish whether the computed metric value exceeds, or falls below, the predetermined threshold value.

If, for example, executed adaptive training and testing module 178 were to establish that the computed metric value falls below the predetermined threshold value, third-party computing system 160 may establish that the trained convolutional neural network model is insufficiently accurate for deployment and a real-time application to homomorphically encrypted customer data. Executed adaptive training and testing module 178 may perform operations (not illustrated in FIG. 1C) that transmit data indicative of the established inaccuracy to executed input module 174, which may perform any of the exemplary processes described herein to generate one or more additional encrypted training datasets and to provision those additional encrypted training datasets to executed adaptive training and testing module 178. In some instances, executed adaptive training and testing module 178 may receive the additional encrypted training datasets, and may perform any of the exemplary processes described herein to train further the convolutional neural network model against the homomorphically encrypted elements of training data included within each of the additional encrypted training datasets.

Alternatively, if executed adaptive training and testing module 178 were to establish that the computed metric value exceeds the predetermined threshold value, third-party computing system 160 may deem the convolutional neural network model adaptively trained, and the trained convolutional neural network model ready for deployment and real-time application to homomorphically encrypted customer data. In some instances, executed adaptive training and testing module 178 may generate model data 186 that includes model coefficients, model parameters, and thresholds of the trained convolutional neural network model, and additional data characterizing the operations and activation functions that specify the input, hidden and output layers of the trained convolutional neural network model (and a nodal composition of each layer). Further, executed adaptive training and testing module 178 may also generate input data 188, which characterizes a composition of an encrypted input dataset for the trained convolutional neural network model, and may perform operations that package model data 186 and input data 188 into corresponding portions of trained convolutional neural network data 190. As illustrated in FIG. 1C, executed adaptive training and testing module 178 may perform operations that store trained convolutional neural network data 190 within third-party data store 162.

b. Exemplary Processes for Predicting Credit Scores in Real Time Using Trained Artificial Intelligence Processes within a Distributed Computing Environment In some examples, a publicly accessible, distributed or cloud-based computing cluster, such as the distributed components of third-party computing system 160, may perform operations that adaptively train a machine learning or artificial intelligence process, such as a convolutional neural network model, using homomorphically encrypted elements of training and testing data, such as encrypted training datasets 176 and encrypted testing datasets 178. As described herein, the trained convolutional neural network model may ingest elements of homomorphically encrypted input data that include, among other things, homomorphically encrypted elements of confidential profile, account, transaction, or reporting data characterizing one or more customers of a financial institution, and may generate elements of homomorphically encrypted output data indicative of a predicted credit score of the one or more customer during a current temporal interval and further, during one or more future temporal intervals. Certain of these exemplary processes, which adaptively train a convolutional neural network model to ingest locally maintained, homomorphically encrypted elements of input data, and to generate homomorphically encrypted output data, may enable the distributed components of third-party computing system 160 to maintain the privacy and confidentiality of the customer data during an initial training phase, and during a subsequent deployment phase, and while enabling the financial institution to leverage the computational efficiencies associated with vector operations (or matrix operations) performed by one or more GPUs (or one or more TPUs) of the distributed components of third-party computing system 160.

Further, and as described herein, third-party computing system 160 may perform additional exemplary processes that apply the trained convolutional neural network model to elements of homomorphically encrypted input data that characterizes, among other things, a current, expected, or proposed interaction between the financial institution and a corresponding customer. For example, these interaction may include, but are not limited to, one or more recently initiated purchase transactions involving the corresponding customer, a proposed modification to a scheduled payment involving the corresponding customer, or a proposed modification to a usage of available credit by the corresponding customer. In some instances, and based on an application of the trained convolutional neural network model to the homomorphically encrypted input data, third-party computing system 160 may perform any of the exemplary processes described herein to generate homomorphically encrypted output data (e.g., which represents one or more predicted credit scores for the customer), and to transmit the homomorphically encrypted output data to one or more computing systems of the financial institution, such FI computing system 130.

In some instances, FI computing system 130 may perform any of the exemplary processes described herein to decrypt the homomorphically encrypted output data and provision the decrypted output, e.g., the one or more predicted credit scores, to a device associated with, or operated by the customer. As described herein, one or more application programs executed at the customer device may perform operations that present, to the customer, a graphical representation of the one or more predicted credit scores within a corresponding digital interface. Through a presentation of a real-time indication of a predicted credit score during a current temporal interval, and a real-time indication a predicted credit score during discrete, future temporal intervals, certain of these exemplary processes may enable to the customer to understand an impact of certain behaviors or decisions on the current credit score and further, to identify an impact of a future, contemplated action on that current credit score.

Figure 2A:
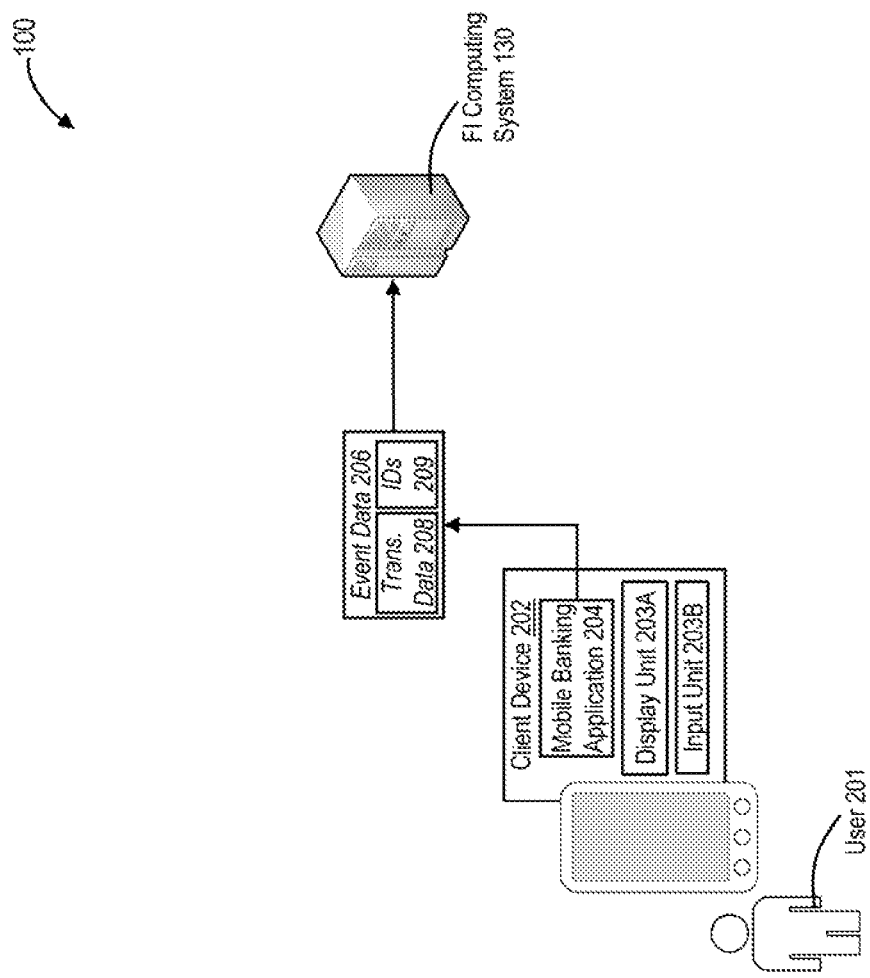

Referring to FIG. 2A, environment 100 may also include one or more computing devices, such as client device 202, interconnected with FI computing system 130 and third-party computing system 160 across one or more communications networks, such as communications network 120 described herein. In some examples, client device 202 may be associated with or operated by a customer of the financial institution associated with FI computing system 130, such as a user 201, and user 201 may hold one or more one or more financial products, instruments, or accounts issued by that financial institution, such as, but not limited to, a deposit account, a credit card account, a home mortgage, or an educational loan.

Client device 202 may include one or more tangible, non-transitory memories that store data and/or software instructions and one or more processors configured to execute the software instructions. Client device 202 may also include a communications interface, such as one or more wireless transceivers, coupled to the one or more processors for accommodating wired or wireless internet communication with the one or more of the computing systems operating within environment 100.

In some instances, client device 202 may include a display unit 203A coupled to the one or more processors and configured to present interface elements to user 201, and one or more additional input units, such as input unit 203B, coupled to the one or more processors and configured to receive input from a user 201. By way of example, display unit 203A may include, but is not limited to, an LCD display, a TFT display, and OLED display, or other appropriate type of display unit, and input unit 203B may include, but is not limited to, a keypad, keyboard, touchscreen, fingerprint scanner, stylus, or any other appropriate type of input unit. Further, in some examples, the functionalities of display unit 203A and input unit 203B may be combined into a single device, such as a pressure-sensitive touchscreen display unit that can present interface elements and can detect an input from user 201 via a physical touch.

Examples of client device 202 may include, but are not limited to, a smart phone, a mobile phone, a tablet computer, a laptop computer, a notebook computer, a hand-held computer, a personal digital assistant, a portable navigation device, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform one or more of the exemplary processes described herein. In some instances, client device 202 may also establish communications with one or more additional computing systems or devices operating within environment 100 across a wired or wireless communications channel, e.g., via the communications interface using any appropriate communications protocol.

The stored software instructions may include one or more application programs, one or more application modules, or other code executable by the one or more processors of client device 202. For instance, client device 202 may store, within the one or more tangible, non-transitory memories, one or more executable mobile applications, such as an executable mobile banking application 204 associated with the financial institution. In some examples, when executed by the one or more processors of client device 202, executed mobile banking application 204 may cause client device 202 to establish a secure, programmatic channel of communications with FI computing system 130 across network 120, and to generate, and render for presentation via display unit 203A, one or more digital interfaces.

As illustrated in FIG. 2A, the one or more processors of client device 202 may execute mobile banking application 204, which may perform operations that generate and transmit one or more elements of event data 206 across network 120 to FI computing system 130. In some instances, the elements of event data 206 may include transaction data 208 identifying and characterizing one or more transactions initiated at client device 202 during a particular temporal interval, and one or more identifiers 209 of user 201, executed mobile banking application 204, or client device 202. Further, in some instances, executed mobile banking application 204 may perform operations that cause client device 202 to generate event data 206, and to transmit event data 206 across network 120 to FI computing system 130, at predetermined temporal intervals and without active input from user 201 (e.g., via input unit 203B). For example, the predetermined temporal intervals may include, but are not limited to, an hourly temporal interval, a daily temporal interval, a weekly temporal interval, or any additional or alternate interval appropriate to user 201 or the interactions between user 201 and the financial institution.

In some examples, the one or more initiated transactions may corresponding to a plurality of purchase transactions initiated at client device 202 on Dec. 1, 2020, and involving a first credit card issued to user 201 by the financial institution, and transaction data 208 may include, for each of the initiated purchase transactions, a transaction amount, a transaction date (e.g., December $1^{st}$), an identifier of a corresponding merchant, one or more identifiers of a corresponding product or service involved in the purchase transaction, and data identifying the first credit card (e.g. a portion of a tokenized account number, an account identifier, etc.). The disclosed embodiments are, however, not limited to these examples of transaction data, and in other instances, transaction data 208 may include any additional, or alternate, information that identifies and characterizes the purchase transactions initiated at client device 202 or by user during the particular temporal interval.

Further, in some examples, identifiers 209 may include one or more unique identifiers of user 201 (e.g., an alphanumeric login credential, a biometric credential, such as a facial image of a thumbprint scan, etc.), one or more unique identifiers of client device 202 (e.g., a network address, such as an IP or a MAC address), or one or more unique identifiers of executed mobile banking application 204 (e.g., an application cryptogram, etc.). Although not illustrated in FIG. 2A, executed mobile banking application 204 may also perform operations that encrypt all, or a selected portion of, event data 206 prior to transmission across network 120 to FI computing system 130, e.g., using a public cryptographic key associated with, and distributed by, FI computing system 130.

Figure 2B:
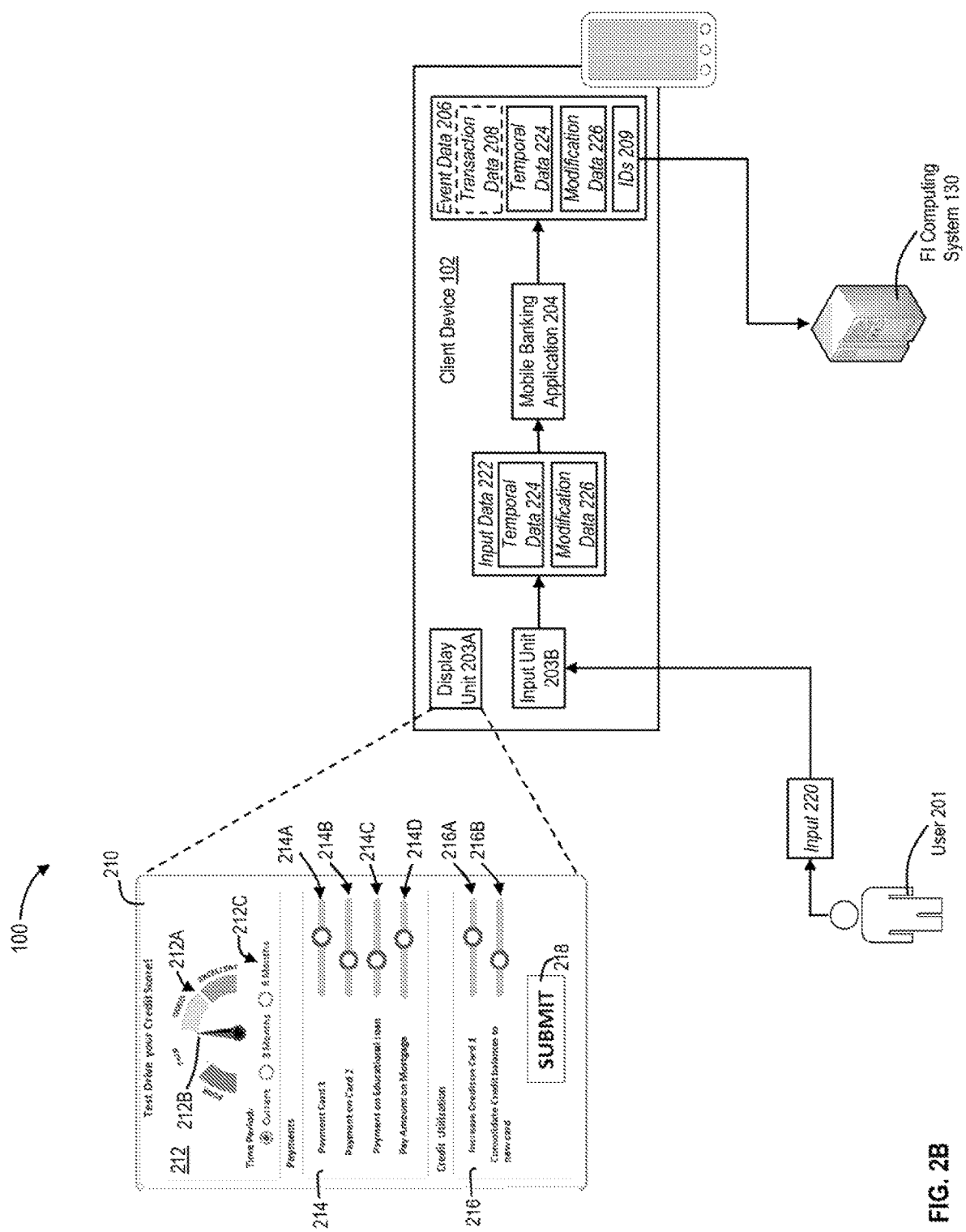

In other examples, described in reference to FIG. 2B, executed mobile banking application 204 may perform operations that cause client device 202 to present, within a corresponding digital interface via display unit 203A, one or more interface elements that enable user 201 to not only visualize graphically a current credit score, but also to "test drive" an impact of one or more financial decisions on not only a current credit score, but also a corresponding future credit score. For instance, the one or more financial decisions may include, but are not limited to, a proposed modification to a scheduled payment involving one or more financial products, instruments, or accounts held by user 201 or a proposed modification to a usage of credit extended by the financial institution to user 201 (e.g., and available to user 201). Further, and based on input responsive to the presented digital interface and provided by user 201 to client device 202 (e.g., via input unit 203B), executed mobile banking application 204 may perform operations that generate additional elements of event data 206 characterizing each of the proposed modifications, and that cause client device 202 to transmit the one or more additional elements of event data 206 across network 120 to FI computing system 130.

Referring to FIG. 2B, executed mobile banking application 204 may perform operations that cause client device 202 to present, via display unit 203, a digital interaction interface 210 having one or more interface elements 212 that provide a graphical indication of a current credit score of user 201 during a current temporal interval or a predicted credit score of user 201 during one of more future temporal intervals. For example, interface elements 212 may include interface elements 212A, which identify and characterize ranges of credit scores for user 201 (e.g., via textual labels "Excellent," "Good," "Fair," or "Poor") and that associate each of the ranges of credit scores within a corresponding color (e.g., associating the range of "Excellent" credit scores with a dark green color, associating the range of "Good" credit scores with a light green color, associating the range of "Fair" credit scores with a yellow color, and associating the range of "Poor" credit scores with a red color).

Further, interface elements 212 may also include a pointer 212B disposed within the ranges of credit scores represented by interface elements 212A, and a position of pointer 212B within interface elements 212A may indicate a credit score of user 201 during a temporal interface specified by temporal interface elements 212C. For example, as illustrated in FIG. 2B, temporal interface elements 212C may identify a current temporal interval, and the position of pointer 212B within interface elements 212A indicate that a current credit score falls between "Good" and "Fair." The disclosed embodiments are, however, not limited to these exemplary graphical representations of the credit score of user 201 during the current or future temporal intervals, and in other examples, interface elements 212 may include any additional or alternate representation of the credit score of user 201 during a corresponding temporal interval, including, but not limited to, a textual indication of the credit score and the temporal interval.

As illustrated in FIG. 2B, digital interaction interface 210 may include interface elements 214 that characterize a current status of one or more scheduled payments associated with financial products, instruments, or accounts held by user 201, and that prompt user 201 to propose a modification to a payment amount associated with one or more of the scheduled payments. For example, user 201 may be associated with, and may hold, a first credit card account and a second credit card account issued by the financial institution, and the first and second credit card accounts may be associated with corresponding, and different, monthly payments. Further, the financial intuition may also issue, to user 201, a secured mortgage and an unsecured educational loan, and both the mortgage and the educational loan may be under repayment. In some instances, interface elements 214 may include one or more discrete, slidable interface elements 214A, 214B, 214C, and 214D that indicate a current payment amount associated with respective ones of the first credit card, the second credit card, the mortgage, and the educational loan, and based on input provided to client device 202 (via input unit 203B), and that allow user 201 to propose a modification to the current payment amount associated with respective ones of the first credit card, the second credit card, the mortgage, and the educational loan.

Digital interaction interface 210 may also include interface elements 216 that characterize a current utilization of available credit by user 201, and that prompt user 201 to propose a modification to that current utilization. For example, interface elements 216 may include a slidable interface element 216A that identifies a current credit limit associated with the first credit card account, and that allows user 201 to propose a modification to the current credit limit. Interface elements 216 may include a slidable interface element 216B that identifies an amount of a current credit balance of user 201 consolidated onto an additional payment card or other secured or unsecured credit line, and that allows user 201 propose a modification to the consolidated amount. The disclosed embodiments are not limited to these exemplary interface elements, and in other instances, digital interaction interface 210 may include any additional, or alternate, interface elements that characterize a current status of one or more outstanding payments involving user 201, or a current usage of credit by user 201, and that facilitate an interaction with the scheduled payments or the credit usage.

By way of example, and in view of an expected initiation of one or more purchase transactions involving the first credit card issued by the financial institution, user 201 may elect to determine an impact on a current credit score of: (i) a proposed increase in the current payment amount scheduled for the first credit card from $150 to $500; (ii) a proposed decrease in the current payment amount scheduled for the second credit card from $450 to a minimum of $150; and (iii) a proposed increase the current credit limit associated with the first credit card account, e.g., from $5,000 to $10,000. In some instances, user 201 may provide input 220 to client device 202 to client device 202 (e.g., via input unit 203B) that, among other things, selects a portion of temporal interface elements 212C associated with the current temporal interval, and that adjusts slidable interface elements 214A, 214B, and 216A to reflect, respectively, the proposed increase in the scheduled payment amount for the first credit card, the proposed decrease in the scheduled payment amount for the second credit card, and the proposed increase the current credit limit of the first credit card. Further, and via input 220, user 201 may also select interface element 218 (e.g., a "SUBMIT" icon), which requests that executed mobile application transmit data indicative of the proposed modifications and the corresponding temporal interval to FI computing system 130, e.g., within portions of event data 206.

As illustrated in FIG. 2B, executed mobile banking application 204 may receive input data 222, which includes temporal data 224 that identifies the specified, current temporal interval (and additionally, or alternatively, one or more future temporal intervals), and modification data 226 that identifies and characterizes the proposed modifications to the scheduled payments and credit utilization. In some instances, modification data 226 may include, among other things, data identifying the first credit card (e.g. a portion of a tokenized account number, an account identifier, etc.), the proposed increase in the scheduled payment amount for the first credit card (e.g., from $150 to $500), and the proposed increase in the credit limit of the first credit card (e.g., from $5,000 to $10,000). Further, modification data 226 may also include, among other things, data identifying the second credit card (e.g. a portion of a tokenized account number, an account identifier, etc.) and the proposed decrease in the scheduled payment amount for the second credit card (e.g., from $450 to the minimum of $150).

Executed mobile banking application 204 may perform operations that package temporal data 224 and modification data 226 into corresponding portions of event data 206, along with the one or more identifiers 209 of user 201, client device 202, or executed mobile banking application 204, as described herein. Event data 206 may also include one or more elements of transaction data 208, which identify and characterize one or more purchase transactions initiated at client device 202 during the particular temporal interval, as described herein. Executed mobile banking application 204 may also perform operations that cause client device 202 to transmit event data 206 across network 120 to FI computing system 130. Further, although not illustrated in FIG. 2A, executed mobile banking application 204 may also perform operations that encrypt all, or a selected portion of, event data 206 prior to transmission across network 120 to FI computing system 130, e.g., using the public cryptographic key associated with, and distributed by, FI computing system 130.

Figure 2C:
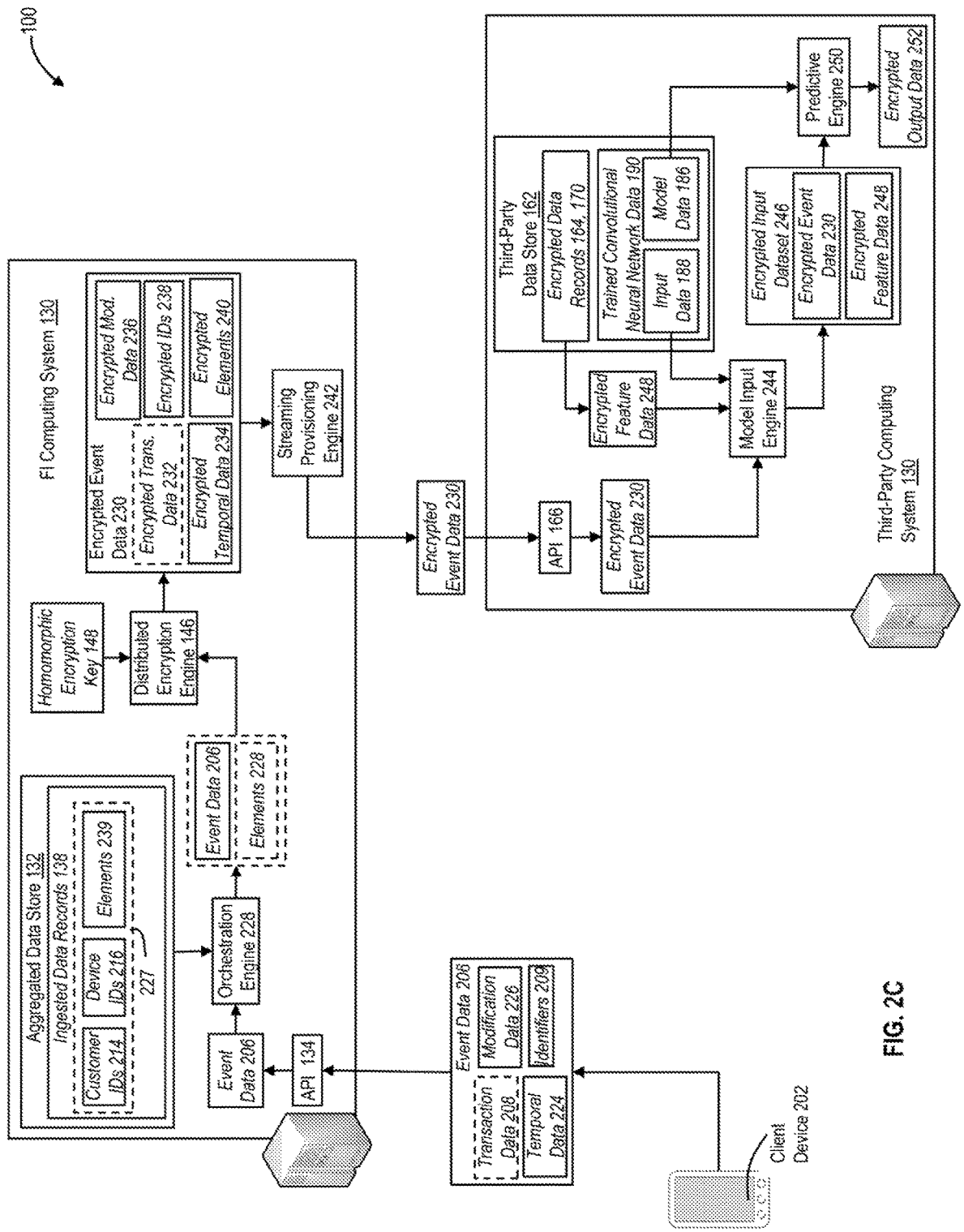

Referring to FIG. 2C, a programmatic interface established and maintained by FI computing system 130, such API 134, may receive event data 206, and may route event data 206 to an orchestration engine 228 executed by FI computing system 130. As described herein, all, or a selected portion, of event data 206 may be encrypted (e.g., using the public cryptographic key of FI computing system 130), and executed orchestration engine 228 may perform operations that decrypt the encrypted portions of event data 206 using a corresponding private cryptographic key associated with FI computing system 130 (not illustrated in FIG. 2C). Further, in some examples, executed orchestration engine 228 may perform operations that route event data 206 (in decrypted form) to distributed encryption engine 146, which, as described herein, may be executed by the distributed components of FI computing system 130.

In some examples, executed distributed encryption engine 146 may perform operations that obtain homomorphic encryption key 148 associated with FI computing system 130 (and as such, with the financial institution) from one or more of the tangible, non-transitory memories of FI computing system 130. As described herein, homomorphic encryption key 148 may be consistent with, and generated in accordance with, a corresponding homomorphic encryption scheme, such as, but not limited to, a fully homomorphic encryption scheme facilitating arbitrary computations on ciphertext and generating encrypted results that, when decrypted, match the results of the arbitrary computations performed on corresponding elements of plaintext. Examples of these fully homomorphic encryption schemes include, but are not limited to, a TFHE encryption scheme that facilitates verifiable computations on integer ciphertext and a SEAL encryption scheme or a PALISADE encryption scheme that facilitates verifiable computations on floating-point ciphertext.

Executed distributed encryption engine 146 may perform any of the exemplary processes described herein to encrypt each of the elements of event data 206 using homomorphic encryption key 148, and generate one or more elements of homomorphically encrypted event data 230. For example, and as described herein, event data 206 may include, but is not limited to: transaction data 208 that characterizes one or more transactions initiated at client device 202; temporal data 224 that specifies the current temporal interval specified by user 201 (and additionally, or alternatively, the one or more future temporal intervals); modification data 226 that includes the data identifying the first credit card, the proposed increase in the scheduled payment amount for the first credit card (e.g., from $150 to $500), the proposed increase in the credit limit of the first credit card (e.g., from $5,000 to $10,000), the data identifying the second credit card, and the proposed decrease in the scheduled payment amount for the second credit card (e.g., from $450 to the minimum of $150); and identifiers 209. In some instances, executed distributed encryption engine 146 may perform any of the exemplary processes described herein to encrypt, using homomorphic encryption key 148, each of transaction data 208, temporal data 224, modification data 226, and identifiers 209, and to generate homomorphically encrypted transaction data 232, homomorphically encrypted temporal data 234, homomorphically encrypted modification data 236, and homomorphically encrypted identifiers 238, e.g., within homomorphically encrypted event data 230.

Further, in some examples, executed orchestration engine 228 may also perform operations that augment event data 206 with one or more additional elements of the customer data associated with user 201 (e.g., the customer profile, account, transaction, or profile data described herein), which FI computing system 130 may maintain within aggregated data store 132. For instance, executed orchestration engine 228 may parse event data 206 to obtain identifiers 209, which uniquely identify user 201, client device 202, and/or executed mobile banking application 204. Further, executed orchestration engine 228 may access one or more of ingested data records 138 within aggregated data store 132, and based on one or more of identifiers 209, determine that at least one of ingested data records 138, such as data record 227, includes or references the one or more of identifiers 209 and as such, includes elements of confidential customer profile, account, transaction, or reporting data associated with user 201.

As illustrated in FIG. 2C, executed orchestration engine 228 may access data record 227, and may obtain one or more elements 239 of the confidential customer profile, account, transaction, or profile data associated with user 201. Executed orchestration engine 228 may also route elements 239 to executed distributed encryption engine 146 (e.g., subsequent to, or concurrently with event data 206, as described herein), and executed distributed encryption engine 146 may perform any of the exemplary processes described herein to homomorphically encrypt elements 239 using homomorphic encryption key 148, and output homomorphically encrypted elements 240 of the customer data, e.g., within homomorphically encrypted event data 230.

In some examples, executed distributed encryption engine 146 provide homomorphically encrypted event data 230 as an input to a streaming provisioning engine 242. Upon execution by FI computing system 130, streaming provisioning engine 242 may perform operations that cause FI computing system 130 to transmit homomorphically encrypted event data 230 across network 120 to third-party computing system 160, e.g., in real-time and contemporaneously with the receipt of event data 206 and the homomorphic encryption of event data 206 and/or elements 239 by executed distributed encryption engine 146.

As described herein, the distributed components of FI computing system 130 may execute orchestration engine 228, distributed encryption engine 146, and streaming provisioning engine 242, and may perform corresponding ones of the exemplary processes described herein in parallel across the distributed components. The parallel implementation of orchestration engine 228, distributed encryption engine 146, and streaming provisioning engine 242 by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.). Further, and by way of example, orchestration engine 228 and/or streaming provisioning engine 242 may, upon execution of by the distributed components of FI computing system 130, establish a distributed, enterprise-based streaming platform (e.g., via one or more protocols of an Apache Kafka™ distributed streaming platform), that receives elements of event data from a corresponding application layer (e.g., including API 134) and that orchestrates not only a homomorphic encryption of the received elements of event data, but also a real-time transmission of the homomorphically encrypted event data (e.g., encrypted event data 230, described herein) across network 120 to third-party computing system 160, the distributed components of which may be configured as a publicly accessible, third-party computing cluster.

Referring back to FIG. 2C, a programmatic interface established or maintained by third-party computing system 160, such as API 166, may receive homomorphically encrypted event data 230 from FI computing system 130, and may route the elements of homomorphically encrypted event data 230 to a model input engine 244 executed by third-party computing system 160. Executed model input engine 244 may receive homomorphically encrypted event data 230, and may perform operations that access trained convolutional neural network data 190 within third-party data store 162, and obtain input data 188 that characterizes a composition of an encrypted input dataset for the trained convolutional neural network model. Based on input data 188, executed model input engine 244 may also perform operations that package all, or a selected portion, of the elements of homomorphically encrypted event data 230 into corresponding portions of an encrypted input dataset 246 for the adaptively trained convolutional neural network As described herein, the elements of homomorphically encrypted event data 230 (e.g., that includes, among other things homomorphically encrypted transaction data 232, homomorphically encrypted temporal data 234, homomorphically encrypted modification data 236, homomorphically encrypted identifiers 238, and homomorphically encrypted elements 240. In some instances, executed model input engine 244 may perform operations that parse the elements of homomorphically encrypted event data 230, and based on model input data 188, package one or more of the elements of homomorphically encrypted event data 230 within corresponding portions of encrypted input dataset 246, e.g., to populate, structure, and order encrypted input dataset 246 in accordance with input data 188.

In further examples, and based on portions of input data 188, executed model input engine 244 may perform operations that enrich encrypted input dataset 246 within additional elements of homomorphically encrypted customer data associated with user 201 and maintained within third-party data store 162 (e.g., the homomorphically encrypted customer profile, account, transaction, or reporting data described herein). For example, executed model input engine 244 may access one or more of encrypted data records 164 and 170 maintained within third-party data store 162, and may perform operations that identify a subset of the encrypted data records 164 and 170 associated with user 201 (e.g., that include homomorphically encrypted identifiers 238). Based on the portions of model input data 188, executed model input engine 244 may perform operations that obtain one or more elements of encrypted feature data 248 from the subset of the encrypted data records 164 and 170, and that package the one or more elements of encrypted feature data 248 into corresponding portions of encrypted input dataset 246.

For example, the one or more elements of encrypted feature data 248 may include, but are not limited to, homomorphically encrypted data may include one or more of the elements of homomorphically encrypted training datasets 176 or homomorphically encrypted testing datasets 184, such as the exemplary elements described herein. In other examples, the one or more elements of encrypted feature data 248 may include a homomorphically encrypted credit score of user 201 during the current temporal interval, or one or more additional homomorphically encrypted credit scores of user 201 during prior temporal intervals. The disclosed embodiments are, however, not limited to these examples of encrypted feature data 248, and in other instances, the encrypted feature data 248 may include any additional, or alternate, elements of homomorphically encrypted data consistent with input data 188 and appropriate for ingestion by the trained convolutional neural network model.

Referring back to FIG. 2C, executed model input engine 244 may route encrypted input dataset 246 to a predictive engine 250 of third-party computing system 160. Upon execution by third-party computing system 160, predictive engine 250 may perform operations that access trained convolutional neural network data 190 within third-party data store 162 and obtain model data 186. As described herein, model data 186 may include the model coefficients, model parameters, and thresholds of the trained convolutional neural network model, and additional data characterizing the operations and activation functions associated with the input, hidden and output layers of the trained convolutional neural network model.

In some examples, and based on portions of model data 186, executed predictive engine 250 may perform operations that establish a plurality of nodes of a convolutional neural network (e.g., that "build" the convolutional neural network), each of which receive, as inputs (e.g., "ingest"), corresponding elements of encrypted input dataset 246. Further, and based on the execution of predictive engine 250, and on the ingestion of encrypted input dataset 246 by the established nodes of the convolutional neural network, the distributed components of third-party computing system 160 may perform operations that apply the trained convolutional neural network model to the homomorphically encrypted elements of encrypted input dataset 246, and that generate one or more elements of homomorphically encrypted output data 252, which include, among other things, a homomorphically encrypted credit score of user 201 predicted during a current temporal interval, and during one or more future temporal intervals.

As described herein, the distributed components of third-party computing system 160 may execute predictive engine 250, and may perform parallel processing to apply the trained convolutional neural network model to the homomorphically encrypted elements of encrypted input dataset 246. The parallel implementation of predictive engine 250 by the distributed components of third-party computing system 160 may, in some instances, be based on an implementation, across the distributed components, of one or more of the parallelized, fault-tolerant distributed computing and analytical protocols described herein (e.g., the Apache Spark™ distributed, cluster-computing framework, etc.).

Further, and as described herein, the distributed components of third-party computing system 160 may correspond to a public, third-party computing cluster that includes one or more GPUs or TPUs configured to operate as a discrete cluster implementing the one or more parallelized, fault-tolerant distributed computing and analytical processes (e.g., the Databricks™ analytical platform). In some instances, and through the implementation of the parallelized, fault-tolerant distributed computing and analytical protocols described herein across the clusters of GPUs and/or TPUs, certain of these exemplary processes may accelerate the homomorphic computations associated with the application of the trained convolutional neural network model to the homomorphically encrypted elements of encrypted input dataset 246 (e.g., when compared with similar homomorphic computations performed on clusters of CPUs capable of processing a single, scalar operation in a single clock cycle), and may facilitate a generation of homomorphically encrypted output data 252, and a provisioning of homomorphically encrypted output data 252 to FI computing system 130, in real time and contemporaneously with the receipt of event data 206 at FI computing system 130.

Figure 2D:
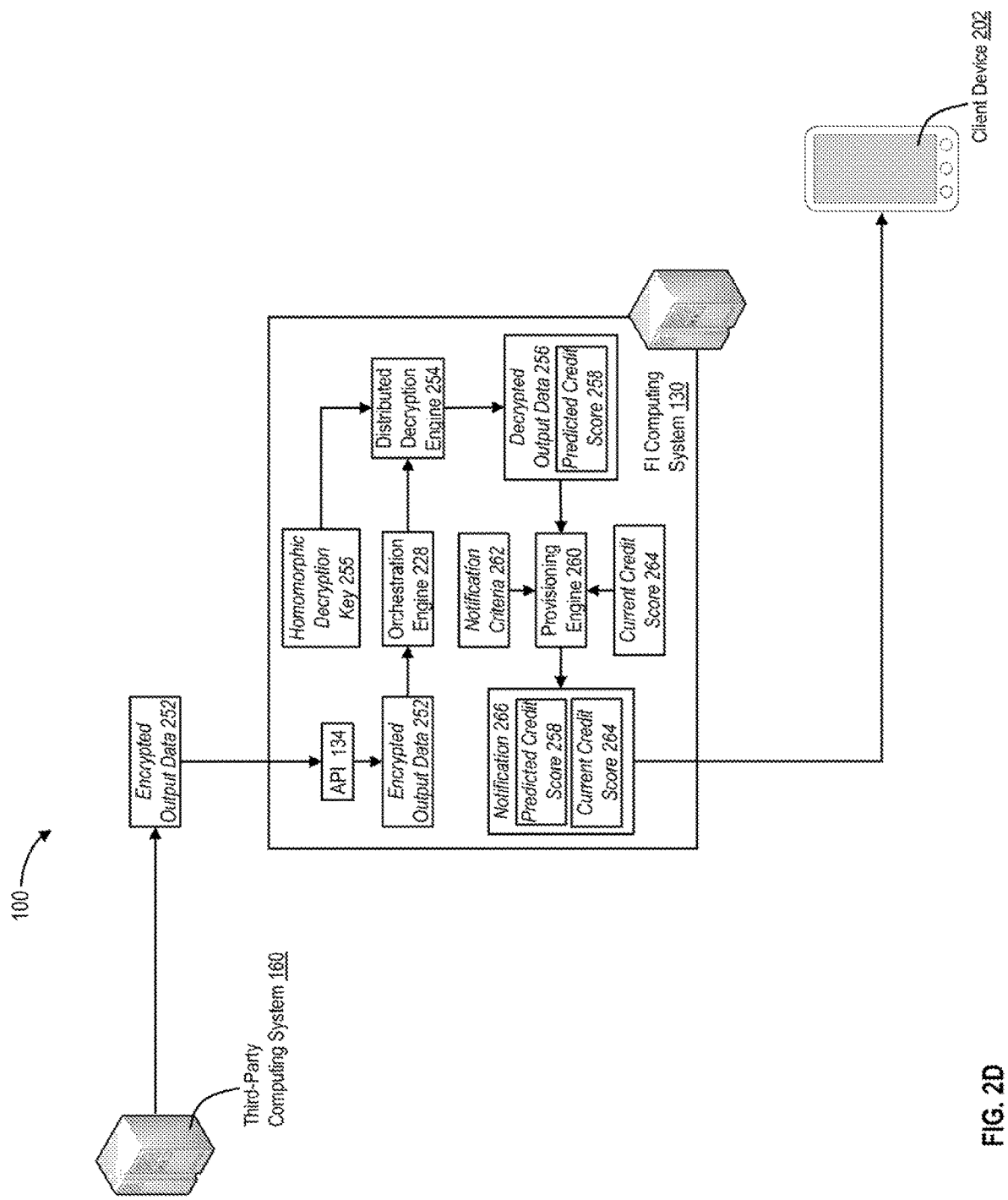

Referring to FIG. 2D, third-party computing system 160 may perform operations that transmit homomorphically encrypted output data 252 across network 120 to FI computing system 130. A programmatic interface established and maintained by FI computing system 130, such as API 134, may receive homomorphically encrypted output data 252 from third-party computing system 160, and may route homomorphically encrypted output data 252 to executed orchestration engine 228 of FI computing system 130. In some instances, executed orchestration engine 228 may perform operations that store homomorphically encrypted output data 252 within a corresponding portion of aggregated data store 132, e.g., as a portion of encrypted data records 150A (not illustrated in FIG. 2D). Further, executed orchestration engine 228 may provide homomorphically encrypted output data 252 as an input to a distributed decryption engine 254 of FI computing system 130.

Upon execution by FI computing system 130, distributed decryption engine 254 may perform operations that obtain a homomorphic decryption key 255 associated with FI computing system 130 (and as such, with the financial institution) from one or more of the tangible, non-transitory memories of FI computing system 130. Executed distributed decryption engine 254 may also perform operations that decrypt homomorphically encrypted output data 252 using homomorphic decryption key 255, and that generate one or more elements of decrypted output data 256. Homomorphic decryption key 255 may, in some instances, corresponding to a symmetric counterpart to homomorphic encryption key 148, and may be consistent with, and generated in accordance with, the homomorphic encryption scheme associated with homomorphic encryption key 148. For example, homomorphic encryption key 148 may include a private homomorphic key associated with, or generated by, FI computing system 130, and homomorphic decryption key 255 may include a public homomorphic key associated with, or generated by, FI computing system 130.

In some examples, the distributed components of FI computing system 130 may execute distributed decryption engine 254, and may perform parallel processing to decrypt homomorphically encrypted output data 252 using homomorphic decryption key 255, and to generate decrypted output data 256. The parallel implementation of distributed decryption engine 254 by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.).

Referring back to FIG. 2D, decrypted output data 256 may include, but is not limited to predicted credit score 258 of user 201 during a current temporal interval. In some instances, not illustrated in FIG. 2D, decrypted output data 256 may also include one or more additional predicted credit scores of user 201 associated with corresponding future temporal intervals, such as, but not limited to, one month, three months, or six months into the future. Executed distributed decryption engine 254 may provide decrypted output data 256, which includes predicted credit score 258 of user 201 during a current temporal interval (and additionally, or alternatively, one or more predicted credit scores of user 201 during corresponding future temporal intervals), as an input to a provisioning engine 260 of FI computing system 130.

Upon execution by FI computing system 130, provisioning engine 260 may perform operations that access aggregated data store 132, and obtain one or more notification criteria 262 associated with user 201 or executed mobile banking application 204. Further, executed provisioning engine 260 may also perform operations that identify, within aggregated data store 132, one or more data records of ingested data records 138 that are associated with user 201, such as data records 138A described herein, and obtain a current credit score 264 of user 201. In some instances, executed provisioning engine 260 may parse notification criteria 262, and based on a determination that predicted credit score 258 is consistent with each of notification criteria 262, executed provisioning engine 260 may perform operations that package predicted credit score 258 (and additionally, or alternatively, one or more predicted credit scores of user 201 during corresponding future temporal intervals) and current credit score 264 into corresponding portions of notification 266.

In some instances, notification criteria 262 may include, but is not limited to, one or more threshold criteria for generating notification 266 based on a relative magnitude of, and a difference between, predicted credit score 258 and current credit score 264. For example, notification criteria 262 may include a first threshold criterion specifying that executed provisioning engine 260 generate notification 266 when a difference between predicted credit score 258 and current credit score 264 exceeds a threshold value. Notification criteria 262 may also include a second threshold criterion specifying that executed provisioning engine 260 generate notification 266 when predicted credit score 258 falls below a threshold score, and a third threshold criterion specifying that executed provisioning engine 260 generate notification 266 when predicted credit score 258 exceeds an additional, or alternate, threshold score. The disclosed embodiments are, however, not limited to these exemplary notification criteria, and in other instances, notification criteria 262 may include any additional, or alternate, notification criteria appropriate to executed mobile banking application 204 and consistent with one or more preferences of user 201.

Based on a determined consistency between predicted credit score 258 and current credit score 264 and one or more of notification criteria 262 (e.g., the first, second, or third threshold criteria described herein), executed provisioning engine 260 may perform operations that cause FI computing system 130 to transmit notification 266 across network 120 to client device 202. Further, although not illustrated in FIG. 2D, executed provisioning engine 260 may also perform operations that encrypt all, or a selected portion of, notification 266 prior to transmission across network 120 to client device 202, e.g., using a public cryptographic key associated with, and distributed by, client device 202 or executed mobile banking application 204.

In some examples, also not illustrated in FIG. 2D, notification 266 may also include incentive data that identifies one or more financial products or services offered by the financial institution associated with FI computing system 130 and appropriate to portions of event data 206 (e.g., the proposed increase in the credit limit of the first credit card held by user 201 from $5,000 to $10,000) or to a difference between predicted credit score 258 and current credit score 264. For example, the incentive data may identify an available home equity line-of-credit that, if accepted by user 201, may assist user 201 in subsidizing the increased credit limit of the first credit card, and the expected transactions that involve that increased credit limit, and the elements of incentive data may identify the available home equity line-of-credit and include additional data facilitating an application for the home equity line-of-credit (e.g., a hyperlink, etc.).

Figure 3A:
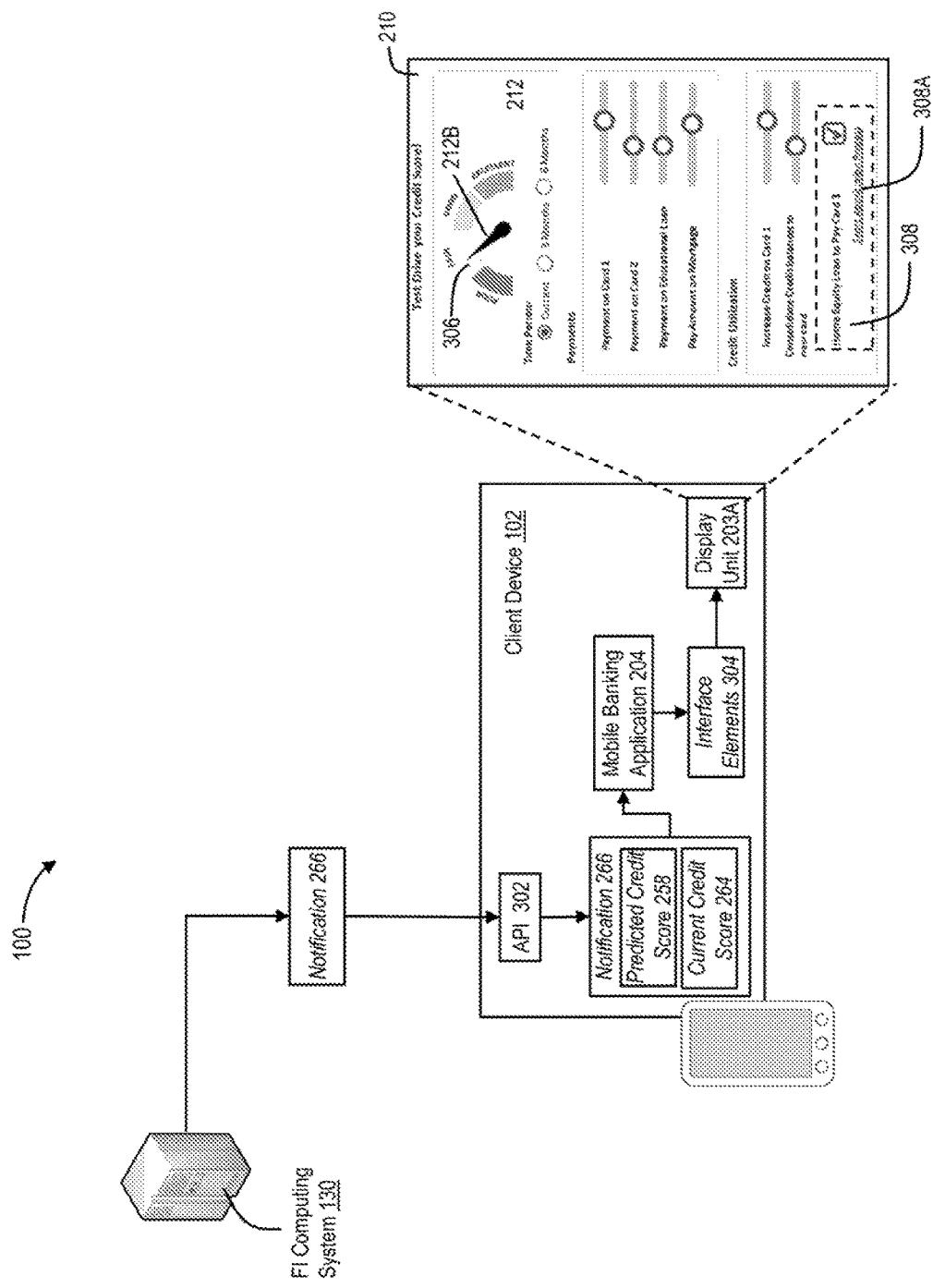

Referring to FIG. 3A, a programmatic interface established and maintained by client device 202, such as an application programming interface (API) 302 associated with executed mobile banking application 204, may receive notification 266, and may route notification data 266 to executed mobile banking application 204. As described herein, notification 266 may include predicted credit score 258 during a current temporal interval, current credit score 264, and in some instances, one or more predicted credit scores of user 201 during corresponding future temporal intervals (not illustrated in FIG. 3A). In some examples, the predicted credit score 258 (or the one or more predicted credit scores of user 201 during corresponding future temporal intervals) may be indicative of a current or future impact, on current credit score 264, of the proposed modifications to the scheduled payments associated with financial products or financial services accounts held by user 201, or to the utilization of available credit by user 201 (e.g. as specified within event data 206). Further, although not illustrated in FIG. 2D, notification 266 may also include one or more elements of incentive data that identify a financial product or service offered by the financial institution associated with FI computing system 130 and appropriate to mitigate the current or future impact of the proposed modifications to the scheduled payments associated with financial products or financial services accounts held by user 201, or to the utilization of available credit by user 201 (e.g. as specified within event data 206).

Executed mobile banking application 204 may process notification 266 (and in some instances, decrypt notification 266), and may generate one or more interface elements 304 that, when presented via display unit 203A, modify portions of digital interaction interface 210 to provide a graphical representation of not only predicted credit score 258, but also of an impact, on current credit score 264, of the proposed modifications to the scheduled payments associated with financial products or financial services accounts held by user 201, or to the utilization of available credit by user 201. For example, and based on predicted credit score 258 and current credit score 264, executed mobile banking application 204 may determine that the proposed modifications to the scheduled payments associated with financial products or financial services accounts held by user 201, or to the utilization of available credit by user 201, would reduce the credit score of user 201 by fourteen points during the current temporal interval and dispose the credit score within the range of "Fair" credit scores described herein.

As illustrated in FIG. 3A, the presentation of interface elements 304 by display unit 203A may modify interface elements 212 of digital interaction interface 210, and may dispose pointer 212B at a modified position 306 within digital interaction interface 210 that indicates predicted credit score 258 of user 201 falls within the range of "Fair" credit scores. In some examples, and based on generated interface elements 304, executed mobile banking application 204 may modify portions of digital interaction interface 210 (e.g., the position of pointer 212B) to indicate graphically, to user 201, the impact of the proposed modifications on the current credit score during the current temporal interval, and to enable user 201 to visually perceive the impact of the proposed modifications upon inspection of digital interaction interface 210.

Further, interface elements 304 may also include one or more incentive-based elements 308 that, when presented within digital interaction interface 210, obscure one or more portions of digital interaction interface 210 and identify a financial product or service available to mitigate the current or future impact of the proposed modifications during the current temporal interval. For example, the incentive-based elements 308 may identify that a home-equity line-of-credit may be available to mitigate an impact of any increase in the credit limit of the first credit card, as proposed by user 201 within event data 206. Upon selection of a corresponding hyperlink 308A by user 201 (e.g., based on additional input provided to client device 202 via input unit 203B), executed mobile banking application 204 may generate and present, via display unit 203, and additional, or alternate, digital interface that enable user 201 to initiate an application for the available home-equity line-of-credit.

Figure 3B:
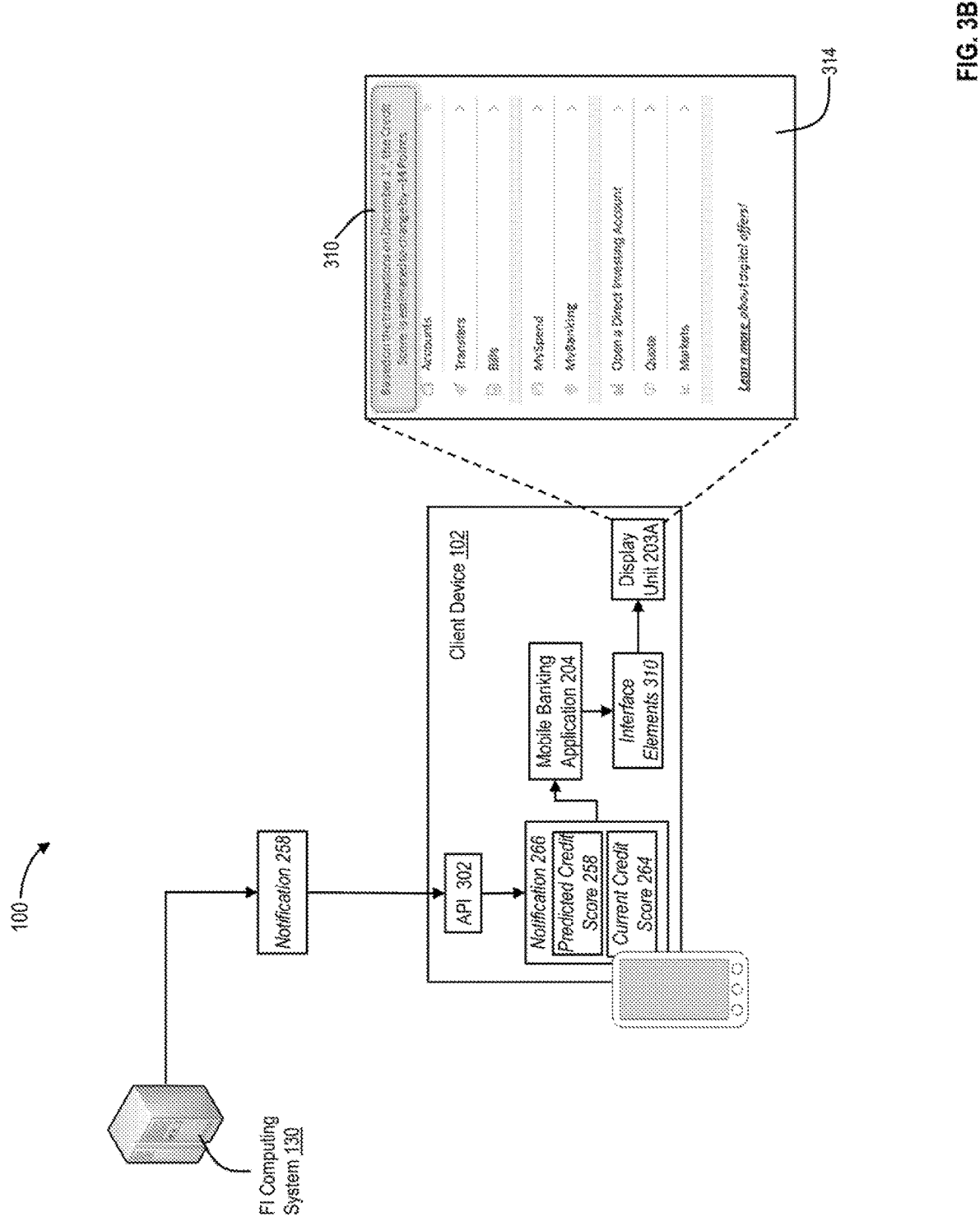

In other examples, described below in reference to FIG. 3B, executed mobile banking application 204 may generate additional or alternate interface elements that, when presented within a corresponding digital interface by display unit 203A, provide user 201 with a graphical representation of the impact, on current credit score 264, of one or more transactions initiated by user 201 during the current temporal interval, such as the plurality of purchase transactions initiated at client device 202 on Dec. 1, 2020, and involving a first credit card issued to user 201 by the financial institution. Referring to FIG. 3B, API 302 may receive and route notification 266 to executed mobile banking application 204. As described herein, executed mobile banking application 204 may process notification 266 (and in some instances, decrypt notification 266), and based on predicted credit score 258 and current credit score 264, executed mobile banking application 204 may determine that the proposed modifications to the scheduled payments associated with financial products or financial services accounts held by user 201, or to the utilization of available credit by user 201, would reduce the credit score of user 201 by fourteen points during the current temporal interval.

In some instances, executed mobile banking application 204 may generate one or more interface elements 310 that, when presented via display unit 203A, modify portions of a corresponding digital interface, such as digital interface 314 associated with mobile banking application 204, to provide a graphical representation of not only predicted credit score 258, but also of an impact, on current credit score 264, of the plurality of purchase transactions initiated at client device 202 on Dec. 1, 2020. For example, presented interface elements 310 may correspond to a notification banner within digital interface 314 that identifies, to user 201, that the plurality of purchase transactions initiated at client device 202 on Dec. 1, 2020, may resulted in a predicted decrease in current credit score 264 of fourteen points, and that obscures at least a portion of the digital content presented within digital interface 314.

The disclosed embodiments are, however, not limited to these exemplary notifications or modifications to the visual characteristics or the positioning of interface elements within the digital interaction interface 210 or within digital interface 314. In other examples, executed mobile banking application 204 may perform operations to modify additional, or alternate, visual characteristics of digital interaction interface 210 or digital interface 314, in a manner that enables user 201 to perceive visually, in real time, predicted credit score 258, or the difference between the predicted credit score 258 and current credit score 264, and to "test drive" an impact of one or more financial or credit decisions on current credit score 264 in real-time. For example, although not illustrated in FIGS. 3A and 3B, executed mobile banking application 204 may also perform operations that generate and present, within digital interaction interface 210 or digital interface 314, a glyph or other element of digital content known to user 201 and associated with predicted credit score 258, or the difference between the predicted credit score 258, and current credit score 26. The presented glyph or other element of digital content may, upon presentation within digital interaction interface 210 or digital interface 314, be characterized by a corresponding visual characteristic or visual effect, such as a flashing effect). In other examples, executed mobile banking application 204 may perform operations that generate and present one or more audible or tactile notifications associated with, and representative to the customer of, predicted credit score 258, or the difference between the predicted credit score 258 and current credit score 264.

Figure 4A:
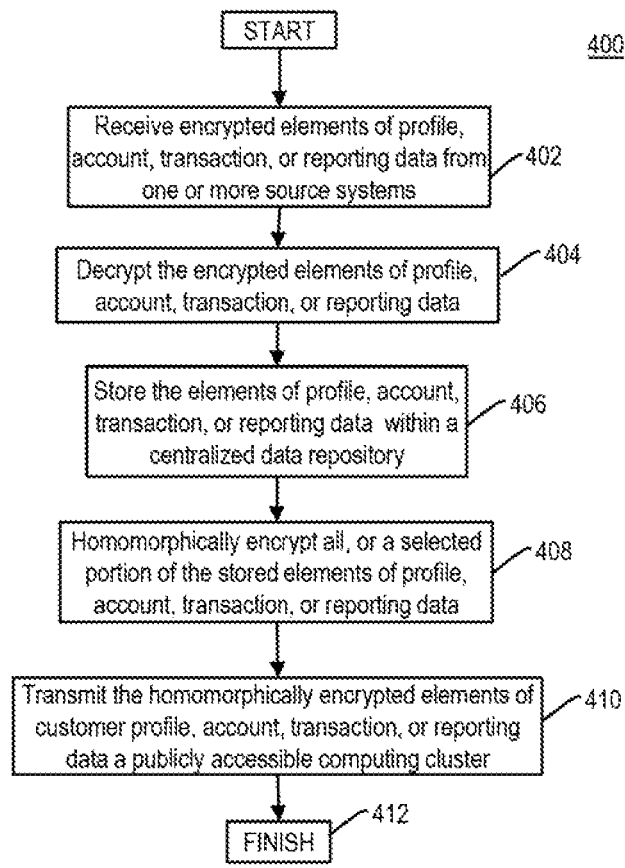
FIGS. 4A and 4B are flowcharts of exemplary processes for adaptively training a convolutional neural network model using homomorphically encrypted data, in accordance with some exemplary embodiments.
Figure 4B:
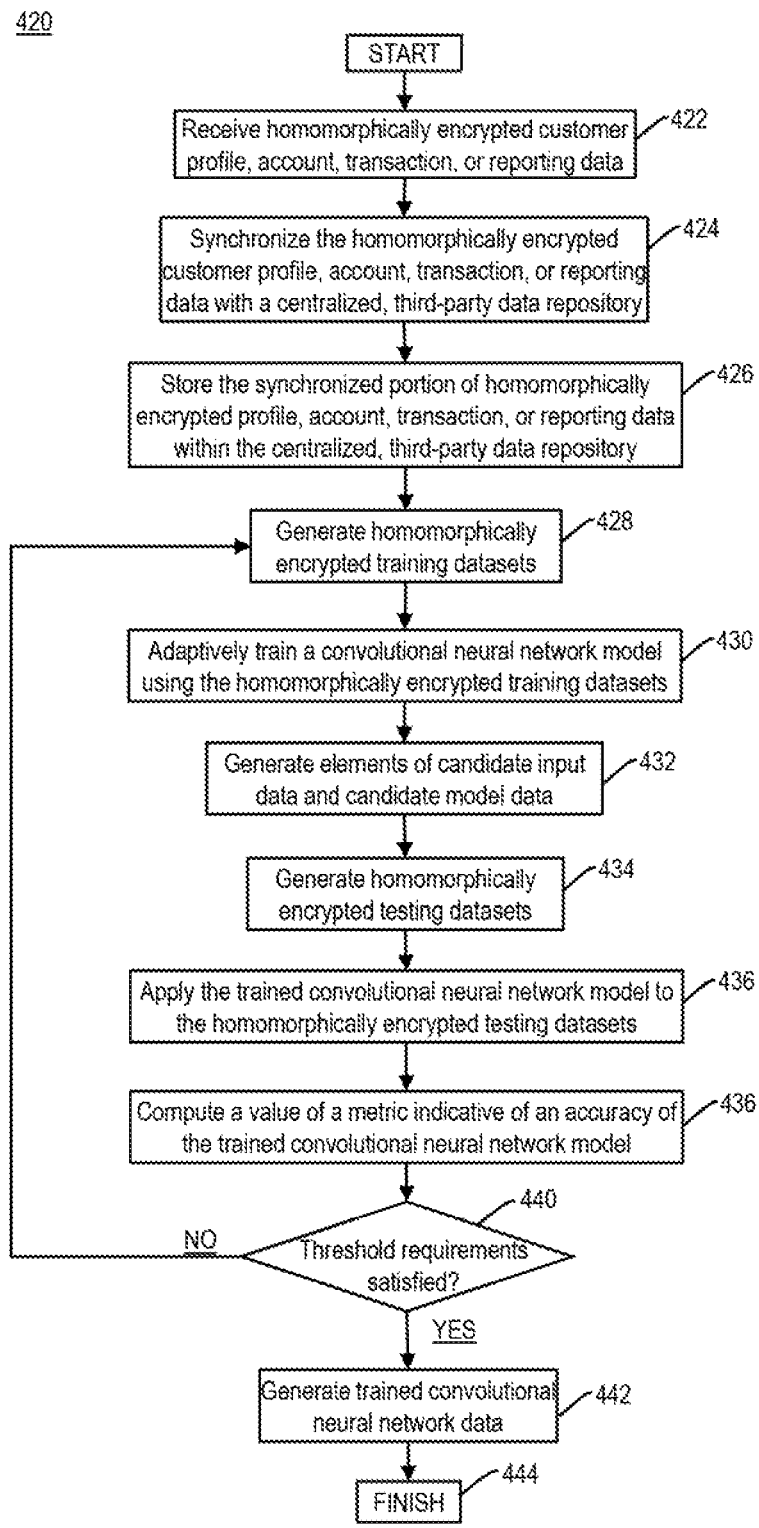

FIGS. 4A and 4B are flowcharts of exemplary processes for adaptively training a convolutional neural network model again homomorphically encrypted elements of training and testing data, in accordance with the disclosed embodiments. For example, one or more computing components of a distributed or cloud-based computing cluster associated with a financial institution, such as one or more of the distributed components of FI computing system 130, may perform one or more of the exemplary steps of exemplary process 400, as described below in reference to FIG. 4A. Further, one or more computing components of a publicly accessible distributed or cloud-based computing cluster, such as one or more of the distributed components of third-party computing system 160, may perform one or more of the exemplary steps of process 420, as described below in reference to FIG. 4B.

Referring to FIG. 4A, FI computing system 130 may receive, from one or more source computing systems, encrypted elements of profile, account, transaction, or reporting data identifying and characterizing corresponding customers of a financial institution, and the interactions between these customers and the financial institution (e.g., in step 402 of FIG. 4A). For example, and described herein, the one or more source systems may include at least one source computing system associated with the financial institution (e.g., internal source system 110A of FIG. 1A)) and at least one source computing system associated with a judicial, regulatory, governmental, or reporting entity unrelated to the financial institution (e.g., external source system 110B of FIG. 1A). In some instances, one or more of the distributed components of FI computing system 130 may perform any of the exemplary processes described herein to decrypt the encrypted elements of profile, account, transaction, or reporting data (e.g., in step 404 of FIG. 4B).

Further, FI computing system 130 may perform any of the exemplary processes described herein to store the decrypted elements of profile, account, transaction, or reporting data within a centralized data repository, such as aggregated data store 132 (e.g., in step 406 of FIG. 4A). As described herein, aggregated data store 132 may correspond to a data lake, a data warehouse, or another centralized repository established and maintained, by the distributed components of FI computing system 130 (e.g., through a Hadoop™ distributed file system), and the distributed components of FI computing system 130 may perform any of the exemplary processes described herein to ingest the received elements of customer profile, account, transaction, or reporting data into the corresponding portions of aggregated data store 132.

In some instances, FI computing system 130 may perform any of the exemplary processes described herein to encrypt all, or a selected, portion of the elements of customer profile, account, transaction, or reporting data maintained within aggregated data store 132 in accordance with a corresponding homomorphic encryption scheme (e.g., in step 408 of FIG. 4A). For example, in step 408, the one or more distributed components of FI computing system 130 may obtain a homomorphic encryption key associated with the corresponding homomorphic encryption schemes (e.g., a private homomorphic key associated with FI computing system 130 or the financial institution), and may perform any of the exemplary processes described herein to encrypt all, or a selected portion, of the elements of customer profile, account, transaction, or reporting data using the homomorphic encryption key.

As described herein, the homomorphic encryption key may be consistent with, and generated in accordance with, the corresponding homomorphic encryption scheme, such as, but not limited to, a fully homomorphic encryption scheme facilitating arbitrary computations on ciphertext and generating encrypted results that, when decrypted, match the results of the arbitrary computations performed on corresponding elements of plaintext. Examples of these fully homomorphic encryption schemes include, but are not limited to, a TFHE encryption scheme that facilitates verifiable computations on integer ciphertext and a SEAL encryption scheme or a PALISADE encryption scheme that facilitates verifiable computations on floating-point ciphertext. Additionally, in some instances, FI computing system 130 may perform any of the exemplary processes described herein to access and encrypt the elements of customer profile, account, transaction, or reporting data at predetermined temporal intervals (e.g., on an hourly basis, on a daily basis, on a weekly basis, etc.) or response to a detected occurrence of a triggering event associated with aggregated data store 132 (e.g., a determination that a number of unencrypted data records within aggregated data store 132 exceeds a threshold number, etc.).

Further, and as described herein, the distributed components of FI computing system 130 may perform parallel processing in step 408 to homomorphically encrypt the elements of customer profile, account, transaction, or reporting data using the homomorphic encryption key. The parallel processing performed by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.).

In some instances, FI computing system 130 may perform any of the exemplary processes described herein to transmit the homomorphically encrypted elements of customer profile, account, transaction, or reporting data across network 120 to a publicly accessible distributed or cloud-based computing cluster (e.g., in step 410 of FIG. 4A). As described herein, FI computing system 130 may transmit the homomorphically encrypted elements of customer profile, account, transaction, or reporting data across network 120 to third-party computing system 160 in batch mode at predetermined temporal intervals (e.g., on an hourly basis, on a daily basis, on a weekly basis, etc.) or response to a detected occurrence of a triggering event associated with aggregated data store 132 (e.g., a determination that a number of encrypted data records within aggregated data store 132 exceeds a threshold number, etc.). Exemplary process 400 is then complete in step 412.

Referring to FIG. 4B, third-party computing system 160 may receive the homomorphically encrypted elements of customer profile, account, transaction, or reporting data from FI computing system 130 (e.g., in step 422 of FIG. 4B). Third-party computing system 160 may also perform any of the exemplary processes described herein to synchronize the homomorphically encrypted elements of customer profile, account, transaction, or reporting data with the encrypted data records maintained a centralized, third-party data repository, such as third-party data store 162 (e.g., in step 424 of FIG. 4B), and to store a synchronized portion of the homomorphically encrypted elements of customer profile, account, transaction, or reporting data within third-party data store 162 (e.g., in step 426 of FIG. 4B). As described herein, third-party data store 162 may correspond to a data lake, a data warehouse, or another centralized repository established and maintained, by the distributed components of third-party computing system 160 (e.g., through a Hadoop™ distributed file system).

In some instances, third-party computing system 160 may perform any of the exemplary processes described herein to generate a plurality of homomorphically encrypted training datasets based on the homomorphically encrypted elements of customer profile, account, transaction, or reporting data maintained within third-party data store 162 (e.g., in step 428 of FIG. 4B). Further, third-party computing system 160 may perform any of the exemplary processes described herein to establish a plurality of nodes of a convolutional neural network (e.g., that "build" the convolutional neural network), which may ingest each of the homomorphically encrypted training (e.g., in step 430 of FIG. 4B). Based on the ingestion of each of homomorphically encrypted training datasets by the established nodes of the convolutional neural network, third-party computing system 160 may perform any of the exemplary processes described herein to adaptively train the convolutional neural network model against the homomorphically encrypted elements of training data included within each of homomorphically encrypted training datasets (e.g., also in in step 430 of FIG. 4B).

Third-party computing system 160 may also perform any of the exemplary processes described herein to generate elements of candidate input data and candidate model data characterizing the trained convolutional neural network model (e.g., in step 432 of FIG. 4B). As described herein, the candidate model data may include one or more candidate model coefficients, candidate model parameters, and candidate thresholds that characterize the trained convolutional neural network model. The candidate model data may also include additional data characterizing the operations and activation functions of the input, hidden and output layers of the trained convolutional neural network model (e.g., defined in accordance with the restrictions imposed by the homomorphic encryption specific, as described above), along with further information that identifies or characterizes the discrete nodes associated with each of the input, hidden, and output layers of the trained convolutional neural network model. Further, the candidate input data may specify a candidate composition of an encrypted input dataset for the trained convolutional neural network model.

In some instances, third-party computing system 160 may perform any of the exemplary processes described herein to generate a plurality of homomorphically encrypted testing datasets 184 having compositions consistent with the candidate input data (e.g., in step 434 of FIG. 4B), and to apply the apply the trained convolutional neural network model to respective ones of the homomorphically encrypted testing datasets and generate elements of homomorphically encrypted output data based on the trained convolutional neural network model to corresponding ones of the homomorphically encrypted testing datasets (e.g., in step 436 of FIG. 4B). As described herein, the elements of homomorphically encrypted output data may correspond to homomorphically encrypted credit scores for one or more customers of the financial institution during a current temporal interval, or during one or more future temporal intervals.

As described herein, the distributed components of third-party computing system 160 may perform parallel processing in step 430 to train adaptively the convolutional neural network model based on the homomorphically encrypted training datasets, and in step 436 to apply the trained convolutional neural network model to respective ones of the homomorphically encrypted testing datasets. The parallel processing performed by the distributed components of third-party computing system 160 may, in some instances, be based on an implementation, across the distributed components, of one or more of the parallelized, fault-tolerant distributed computing and analytical protocols described herein (e.g., the Apache Spark™ distributed, cluster-computing framework, etc.).

Based on the elements of homomorphically encrypted output data, third-party computing system 160 may perform any of the exemplary processes described herein to compute a value of a metric indicative of an accuracy of the trained convolutional neural network model (e.g., in step 438 of FIG. 4B), and to determine whether the computed metric satisfies one or more threshold requirements (e.g., in step 440 of FIG. 4B). For example, the one or more threshold requirements may specify a predetermined threshold value for the trained convolutional neural network model, and third-party computing system 160 may perform any of the exemplary processes described herein to establish whether the computed metric value exceeds, or falls below, the predetermined threshold value (e.g., also in step 440 of FIG. 4B).

If, for example, third-party computing system 160 were to establish that the computed metric value fails to satisfy the one or more threshold requirements (e.g., step 440; NO), third-party computing system 160 may establish that the trained convolutional neural network model is insufficiently accurate for deployment and a real-time application to homomorphically encrypted customer data, and exemplary process 420 may pass back to step 428, as described herein.

If, for example, third-party computing system 160 were to establish that the computed metric value satisfies the one or more threshold requirements (e.g., step 440; YES), third-party computing system 160 may deem the convolutional neural network model adaptively trained and ready for deployment and a real-time application to homomorphically encrypted customer data, and third-party computing system 160 may perform any of the exemplary processes described herein to generate trained convolutional neural network model data that includes the candidate model data and the candidate input data, and to store the trained convolutional neural network model data within third-party data store 162 (e.g., in step 442 of FIG. 4B). Exemplary process 420 is then complete in step 444.

Figure 5A:
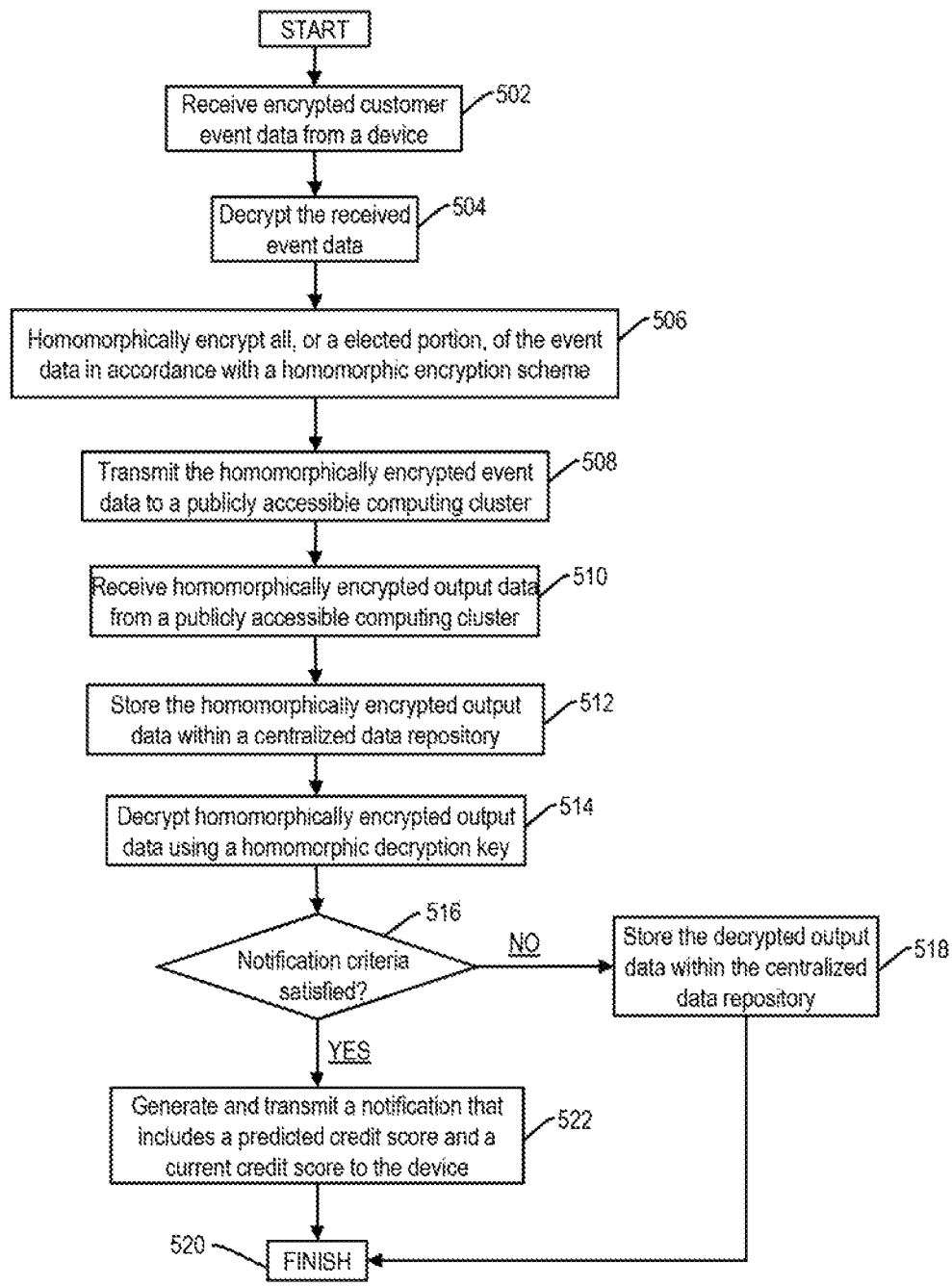
FIGS. 5A and 5B are flowcharts of exemplary processes for predicting a customer credit score based on an application of a trained convolutional neural network model to homomorphically encrypted data, in accordance with some exemplary embodiments.
Figure 5B:
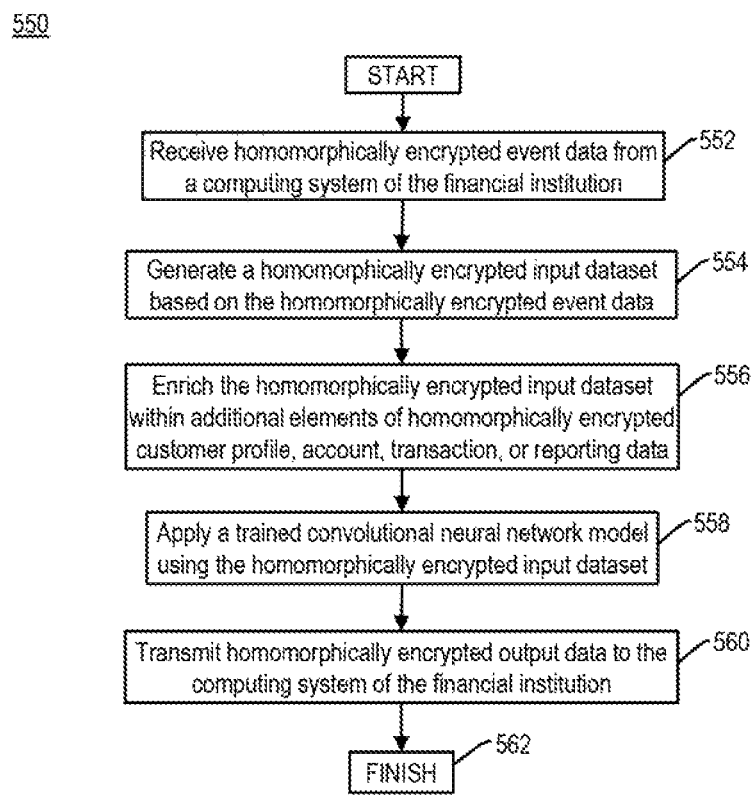

FIGS. 5A and 5B are flowcharts of exemplary processes for predicting a credit score of customer based on an application of a trained convolutional neural network model to homomorphically encrypted input data, in accordance with the disclosed embodiments. For example, one or more computing components of a distributed or cloud-based computing cluster associated with a financial institution, such as one or more of the distributed components of FI computing system 130, may perform one or more of the exemplary steps of exemplary process 500, as described below in reference to FIG. 5A. Further, one or more computing components of a publicly accessible, distributed or cloud-based computing cluster, such as one or more of the distributed components of third-party computing system 160, may perform one or more of the exemplary steps of process 550, as described below in reference to FIG. 5B.

Referring to FIG. 5A, FI computing system 130 may receive encrypted event data from a device associated with, or operable by, a corresponding user, such as client device 202 associated with, or operable by, user 201 (e.g., in step 502). In some examples, the event data may include, but is not limited to, transaction data that identifying and characterizing one or more transactions initiated at client device 202 during a particular temporal interval, and one or more identifiers of user 201, client device 202, or an application program executed at client device 202, such as mobile banking application 204. In additional, or alternate examples, the event data may include a proposed modification to a scheduled payment involving one or more financial products or financial services accounts held by user 201 or a proposed modification to a usage of credit available to user 201 (e.g., as specified within user input provisioned to client device 202 in response to portions of a presented digital interface, such as digital interaction interface 210). FI computing system 130 may also perform any of the exemplary processes described herein to decrypt the encrypted event data using, for example, a public cryptographic key associated with FI computing system 130 (e.g., in step 504 of FIG. 5A).

In some instances, FI computing system 130 may perform any of the exemplary processes described herein to encrypt all, or a selected, portion of the event data in accordance with a corresponding homomorphic encryption scheme (e.g., in step 506 of FIG. 5A). For example, in step 506, FI computing system 130 may obtain a homomorphic encryption key associated with the corresponding homomorphic encryption scheme (e.g., a private homomorphic key associated with FI computing system 130 or the financial institution), and may perform any of the exemplary processes described herein to encrypt all, or a selected portion, of the event data the homomorphic encryption key. Further, FI computing system 130 may perform any of the exemplary processes described herein to transmit the homomorphically encrypted event data across network 120 to a publicly accessible distributed or cloud-based computing cluster, such as third-party computing system 160 (e.g., in step 508 of FIG. 5A).

As described herein, the homomorphic encryption key may be consistent with, and generated in accordance with, the corresponding homomorphic encryption scheme, such as, but not limited to, a fully homomorphic encryption scheme facilitating arbitrary computations on ciphertext and generating encrypted results that, when decrypted, match the results of the arbitrary computations performed on corresponding elements of plaintext. Examples of these fully homomorphic encryption schemes include, but are not limited to, a TFHE encryption scheme that facilitates verifiable computations on integer ciphertext and a SEAL encryption scheme or a PALISADE encryption scheme that facilitates verifiable computations on floating-point ciphertext. Further, and as described herein, the distributed components of FI computing system 130 may perform parallel processing in step 506 to homomorphically encrypt the event data using the homomorphic encryption key. The parallel processing performed by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.).

Referring to FIG. 5B, third-party computing system 160 may receive the homomorphically encrypted event data from FI computing system 130 (e.g., in step 552 of FIG. 5B), and may perform any of the exemplary processes described herein to package all, or a selected portion, of the homomorphically encrypted event data 230 into corresponding portions of an encrypted input dataset for the adaptively trained convolutional neural network (e.g., in step 554 of FIG. 5B). Further, in some examples, third-party computing system 160 may perform any of the exemplary processes described herein to enrich the homomorphically encrypted input dataset within additional elements of homomorphically encrypted customer profile, account, transaction, or reporting data associated with user 201 and maintained within a centralized data repository, such as third-party data store 162 (e.g., in step 556 of FIG. 5B).

In some instances, third-party computing system 160 may perform any of the exemplary processes described herein to establish a plurality of nodes of a convolutional neural network (e.g., that "build" the convolutional neural network), each of which receive, as inputs (e.g., "ingest"), corresponding elements of the homomorphically encrypted input dataset (e.g., in step 558 of FIG. 5B). Further, and based on the ingestion of the homomorphically encrypted training dataset by the established nodes of the convolutional neural network, third-party computing system 160 may perform any of the exemplary processes described herein to apply the trained convolutional neural network model to the homomorphically encrypted elements of encrypted input dataset, and that generate one or more elements of homomorphically encrypted output data (e.g., also in step 558 of FIG. 5B).

As described herein, the one or more elements of homomorphically encrypted output data may include to, among other things, a homomorphically encrypted credit score of user 201 predicted during a current temporal interval, and during one or more future temporal intervals. Further, in some instances the distributed components of third-party computing system 160 may perform parallel processing to apply the trained convolutional neural network model to the homomorphically encrypted elements of the encrypted input dataset. The parallel implementation of application of the trained convolutional neural network model to the encrypted input dataset by the distributed components of third-party computing system 160 may, in some instances, be based on an implementation, across the distributed components, of one or more of the parallelized, fault-tolerant distributed computing and analytical protocols described herein (e.g., the Apache Spark™ distributed, cluster-computing framework, etc.).

Third-party computing system 160 may perform operations that transmit the elements of homomorphically encrypted output data across network 120 to FI computing system 130 (e.g., in step 560 of FIG. 5B). Exemplary process 550 is then complete in step 562.

Referring back to FIG. 5A, FI computing system 130 may receive the elements of homomorphically encrypted output data from third-party computing system 160 (e.g., in step 510 of FIG. 5A), and FI computing system 130 may perform any of the exemplary processes described herein to store the elements of homomorphically encrypted output data within a corresponding portion of a centralized data repository, such as aggregated data store 132, (e.g., in step 512 of FIG. 5A).

FI computing system 130 may also perform any of the exemplary processes described herein to obtain a homomorphic decryption key associated with FI computing system 130 (and as such, with the financial institution) from one or more of the tangible, non-transitory memories of FI computing system 130, and to decrypt the elements of homomorphically encrypted output data using the homomorphic decryption key and generate and elements of decrypted output data (e.g., in step 514 of FIG. 5A). The homomorphic decryption key may, in some instances, corresponding to a symmetric counterpart to the homomorphic encryption key described herein, and may be consistent with, and generated in accordance with, the homomorphic encryption scheme associated with the homomorphic encryption key. For example, the homomorphic encryption key may include a private homomorphic key associated with, or generated by, FI computing system 130, and the homomorphic decryption key may include a public homomorphic key associated with, or generated by, FI computing system 130.

In some examples, the distributed components of FI computing system 130 may perform parallel processing in step 514 to decrypt the elements of homomorphically encrypted output data using the homomorphic decryption key, and to generate decrypted output data. The parallel implementation of these exemplary decryption processes by the distributed components of FI computing system 130 may, in some instances, be based on an implementation, across the distributed components, of one or more of the parallelized, fault-tolerant distributed computing and analytical protocols described herein (e.g., the Apache Spark™ distributed, cluster-computing framework, etc.).

As described herein, the decrypted output data may include, but is not limited to a predicted credit score of user 201 during a current temporal interval, and one or more additional predicted credit scores of user 201 during corresponding future temporal intervals, such as, but not limited to, one month, three months, or six months into the future. In some instances, the one or more distributed components of FI computing system 130 may also perform any of the exemplary processes described herein to access a current credit score of user 201 during the current temporal interval (e.g., as maintained within aggregated data store 132), and to determine whether the predicted credit score satisfies one or more notification criteria (e.g., in step 516 of FIG. 5A). If, for example, the one or more distributed components of FI computing system 130 establish that the predicted credit score fails to satisfy at least one of the notification criteria (e.g., step 516; NO), the one or more distributed components of FI computing system 130 may perform operations that store the predicted credit score within a portion of aggregated data store 132 that is associated with user 201 (e.g., in step 518 of FIG. 5A). Exemplary process 500 is then complete in step 520.

Alternatively, if the one or more distributed components of FI computing system 130 were to establish that the predicted credit score fails satisfies each of the notification criteria (e.g., step 516; YES), the one or more distributed components of FI computing system 130 may perform any of the exemplary processes described herein to generate a notification that includes at least the predicted credit score and the current credit score of user 201, and to transmit the generated notification across network 120 to client device 202 (e.g., in step 522 of FIG. 5A). Further, although not illustrated in FIG. 5A, the one or more distributed components of FI computing system 130 may perform any of the exemplary processes described herein to encrypt all, or a selected portion of, the notification prior to transmission across network 120 to client device 202, e.g., using a public cryptographic key associated with, and distributed by, client device 202 or the executed mobile banking application. Exemplary process 500 is then complete in step 520.

c. Exemplary Computing Architectures

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, application programming interfaces (APIs) 134, 166, and 302, data ingestion engine 136, distributed encryption engine 146, batch provisioning engine 158, data synchronization engine 168, model training engine 172, input module 174, adaptive training and testing module 178, mobile banking application 204, orchestration engine 228, streaming provisioning engine 242, model input engine 244, predictive engine 250, distributed decryption engine 254, and provisioning engine 260, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU), tensor processing unit (TPU), or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network, such as network 120 described herein.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks, such as network 120, include a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems described herein may perform operations that establish and maintain one or more secure channels of communication across the communications network (e.g., network 120), such as, but not limited to, a transport layer security (TSO) channel, a secure socket layer (SSL) channel, or any other suitable secure communication channel.

The exemplary computing systems or environments described herein can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

What is claimed is:

1. An apparatus, comprising:
    a memory storing instructions;
    a communications interface; and
    at least one processor coupled to the memory and the communications interface, the at least one processor being configured to execute the instructions to:
        transmit, via the communications interface, encrypted event data to a computing system, the computing system being configured to apply a trained artificial intelligence process to encrypted feature data that includes the encrypted event data and encrypted customer data;
        receive encrypted output data from the computing system via the communications interface, and decrypt the encrypted output data using a homomorphic decryption key, the decrypted output data comprising a predicted credit score of a customer during at least one temporal interval; and
        transmit at least a portion of the decrypted output data to a device via the communications interface, the device executing an application program that presents a graphical representation of the portion of the decrypted output data within a digital interface.

2. The apparatus of claim 1, wherein:
    the encrypted event data is representative of an occurrence of an event associated with the customer;
    the predicted credit score is representative of an impact of the event on a credit score of the customer during the at least one temporal interval; and
    the executed application program causes the device to present, within the digital interface, an additional graphical representation of the impact of the event on the credit score of the customer during the at least one temporal interval, the additional graphical representation having a visual characteristic that reflects a magnitude of the impact.

3. The apparatus of claim 1, wherein:
    the encrypted output data is representative of the predicted credit score of the customer during at least one of a current temporal interval or a future temporal interval; and
    the at least one processor is further configured to determine the predicted credit score based on the decrypted output data.

4. The apparatus of claim 1, wherein:
    the artificial intelligence process comprises a convolutional neural network; and
    the computing system is further configured to generate encrypted training data based on portions of encrypted customer data and encrypted reporting data, and perform operations that adaptively train the convolutional neural network using the encrypted training data.

5. The apparatus of claim 1, wherein the at least one processor is further configured to execute the instructions to:
    receive, via the communications interface, at least a portion of the event data from the device; and
    encrypt the event data using a homomorphic encryption key.

6. The apparatus of claim 5, wherein:
    the event data comprises transaction data characterizing one or more transactions involving the customer during a prior temporal interval;
    the encrypted output data is representative of the predicted credit score of the customer during a current temporal interval; and
    the at least one processor is further configured to execute the instructions to:
        obtain additional data that includes a prior credit score of the customer during the prior temporal interval; and
        transmit a portion of the additional data and the portion of the decrypted output data to the device via the communications interface.

7. The apparatus of claim 6, wherein the executed application program causes the device to present, within the digital interface, an additional graphical representation of a difference between the predicted credit score and the prior credit score, the additional graphical representation having a visual characteristic that reflects a magnitude of the difference.

8. The apparatus of claim 5, wherein:
the event data comprises modification data associated with the customer and temporal data, the modification data comprising at least one or a proposed modification to a payment transaction or a proposed modification to a usage of available credit, and the temporal data specifying a future temporal interval;
the encrypted output data is representative of the predicted credit score of the customer during the future temporal interval; and
the at least one processor is further configured to execute the instructions to:
load, from the memory, additional data that includes a prior credit score of the customer during a prior temporal interval; and
transmit a portion of the additional data and the portion of the decrypted output data to the device via the communications interface.

9. The apparatus of claim 8, wherein the executed application program causes the device to modify a portion of the digital interface based on the transmitted portions of the additional data and the decrypted output data, the modified portion of the digital interface being indicative of a difference between the predicted credit score and the prior credit score, the modified portion of the digital interface having a visual characteristic that reflects a magnitude of the difference.

10. The apparatus of claim 1, wherein the at least one processor is further configured to:
generate a notification that includes at least the portion of the decrypted output data; and
transmit the notification to the device via the communication interface when the predicted credit score fails to exceed a threshold score.

11. The apparatus of claim 1, wherein the at least one processor is further configured to execute the instructions to:
obtain additional data that includes a prior credit score of the customer during a prior temporal interval;
generate a notification that include the portion of the decrypted output data and a portion of the additional data; and
when a magnitude of a difference between the predicted credit score and the prior credit score exceeds a threshold value, transmit the notification to the device via the communication interface.

12. A computer-implemented method, comprising:
transmit encrypted event data to a computing system using at least one processor, the computing system being configured to apply a trained artificial intelligence process to encrypted feature data that includes the encrypted event data and encrypted customer data;
using the at least one processor, receiving encrypted output data from the computing system, and decrypting the encrypted output data using a homomorphic decryption key, the decrypted output data comprising a predicted credit score of a customer during at least one temporal interval; and
transmitting at least a portion of the decrypted output data to a device using the at least one processor, the device executing an application program that presents a graphical representation of the portion of the decrypted output data within a digital interface.

13. An apparatus, comprising:
a memory storing instructions;
a communications interface; and
at least one processor coupled to the memory and the communications interface, the at least one processor being configured to execute the instructions to:
receive encrypted event data via the communications interface;
based on an application of a trained artificial intelligence process to encrypted feature data that includes the encrypted event data and encrypted customer data associated with a customer, generate encrypted output data representative of a predicted credit score of the customer during at least one temporal interval; and
transmit the encrypted output data to a computing system via the communications interface, the computing system being configured to decrypt the encrypted output data using a homomorphic decryption key and transmit at least a portion of the decrypted output data to a device associated with the customer.

14. The apparatus of claim 13, wherein the at least one processor is further configured to execute the instructions to:
generate the encrypted feature data based on the encrypted event data and on encrypted customer data associated with the customer; and
apply the trained artificial intelligence process to the encrypted feature data.

15. The apparatus of claim 14, wherein the at least one processor is further to configured to:
access modelling data associated with the trained artificial intelligence process, the modelling data specifying a composition or a structure of one or more inputs to the trained artificial intelligence process; and
generate the encrypted feature data in accordance with the modelling data.

16. The apparatus of claim 14, wherein the at least one processor is further configured to execute the instructions to:
access a centralized data repository that maintains the encrypted customer data associated with the customer and additional encrypted customer data associated with a plurality of additional customers; and
obtain the encrypted customer data associated with the customer from the centralized data repository.

17. The apparatus of claim 13, wherein the trained artificial intelligence process comprises a trained convolutional neural network.

18. The apparatus of claim 13, wherein the at least one processor is further configured to execute the instructions to:
obtain additional encrypted customer data associated with the customer and with additional customers;
generate encrypted training data that includes corresponding portions of the additional encrypted customer data; and
perform operations that adaptively train the artificial intelligence process using the encrypted training data.

19. The apparatus of claim 18, wherein:
the encrypted event data is associated with the customer;
the encrypted training data comprises a plurality of sets of encrypted training data associated with a customer subset that includes the customer and one or more of the additional customers;
each of the sets of encrypted training data includes a portion of the additional encrypted customer data associated with a corresponding one of the customer subset; and the at least one processor is further configured to execute the instructions to perform operations that adaptively train the artificial intelligence process using the sets of encrypted training data.

20. The apparatus of claim 18, wherein the at least one processor is further to configured to:
generate modeling data characterizing the trained artificial intelligence process, the modelling data comprising at least one of a model coefficient or a model parameter of the trained artificial intelligence process; and
store the modelling data within the memory.

* * * * *